(12) United States Patent
Lakshminarayanan et al.

(10) Patent No.: US 11,778,135 B2
(45) Date of Patent: Oct. 3, 2023

(54) MULTI-CHANNEL DISPLAY SYSTEMS

(71) Applicant: Texas Instruments Incorporated, Dallas, TX (US)

(72) Inventors: Aravind Lakshminarayanan, Plano, TX (US); Vivek Kumar Thakur, Plano, TX (US); Jobin Raj, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/119,820

(22) Filed: Dec. 11, 2020

(65) Prior Publication Data
US 2021/0185268 A1 Jun. 17, 2021

Related U.S. Application Data

(60) Provisional application No. 62/947,243, filed on Dec. 12, 2019.

(51) Int. Cl.
*H04N 5/45* (2011.01)
*G06F 3/14* (2006.01)
*H04N 5/04* (2006.01)

(52) U.S. Cl.
CPC ............. *H04N 5/45* (2013.01); *G06F 3/1423* (2013.01); *H04N 5/04* (2013.01)

(58) Field of Classification Search
CPC ........ H04N 5/45; H04N 5/04; H04N 13/0051; G06F 3/1423; G06F 3/14; G06F 1/1647; G06F 5/44591; G09G 5/12

USPC ................... 348/563–569, 588; 345/1.1, 204
See application file for complete search history.

(56) References Cited

U.S. PATENT DOCUMENTS

| | | | | |
|---|---|---|---|---|
| 7,463,307 B2* | 12/2008 | Cheng | ...................... | H04N 9/74 348/441 |
| 8,482,672 B2* | 7/2013 | Yuki | .................. | H04N 21/4316 348/565 |
| 8,963,798 B2* | 2/2015 | Lee | ........................ | G06F 3/1446 345/1.1 |
| 8,994,700 B2* | 3/2015 | Foster | ................... | G06F 3/1431 345/204 |
| 10,091,451 B2* | 10/2018 | Lee | ..................... | H04N 21/4312 |
| 2007/0222774 A1* | 9/2007 | Foster | ................... | G06F 3/1431 345/204 |

* cited by examiner

*Primary Examiner* — Trang U Tran
(74) *Attorney, Agent, or Firm* — Michelle F. Murray; Frank D. Cimino

(57) ABSTRACT

Example multi-channel display systems are disclosed. An example apparatus includes at least one processor to execute instructions to at least in response to determining that a first display controller is to provide at least a first portion of video data on a first channel, provide a first control signal to the first display controller instructing the first display controller to provide the at least the first portion of the video data on the first channel, and in response to determining that a second display controller is to provide at least a second portion of the video data on a second channel, provide a second control signal to the second display controller instructing the second display controller to provide the at least the second portion of the video data on the second channel, the second channel different from the first channel.

19 Claims, 17 Drawing Sheets

MULTI-CHANNEL DISPLAY SYSTEMS

CROSS-REFERENCE TO RELATED APPLICATION

This patent application claims the benefit of and priority to U.S. Provisional Patent Application Ser. No. 62/947,243 filed on Dec. 12, 2019, which is hereby incorporated herein by reference in its entirety.

BACKGROUND

Some video display systems have system configurations that drive the display of video input on multiple display devices using respective display channels. In some system configurations, each display channel is implemented by a dedicated front-end processor, display controller, and input/output port to control a corresponding one of the display devices. Implementations of such system configurations have increased system cost due to the additional hardware required to implement each display channel. Implementations of such system configurations may require customized processing of the video input prior to display based on the application or increased system cost.

SUMMARY

For multi-channel display systems, an example apparatus includes at least one processor to execute instructions to at least in response to determining that a first display controller is to provide at least a first portion of video data on a first channel, provide a first control signal to the first display controller instructing the first display controller to provide the at least the first portion of the video data on the first channel, and in response to determining that a second display controller is to provide at least a second portion of the video data on a second channel, provide a second control signal to the second display controller instructing the second display controller to provide the at least the second portion of the video data on the second channel, the second channel different from the first channel.

DETAILED DESCRIPTION

Figure 1A:
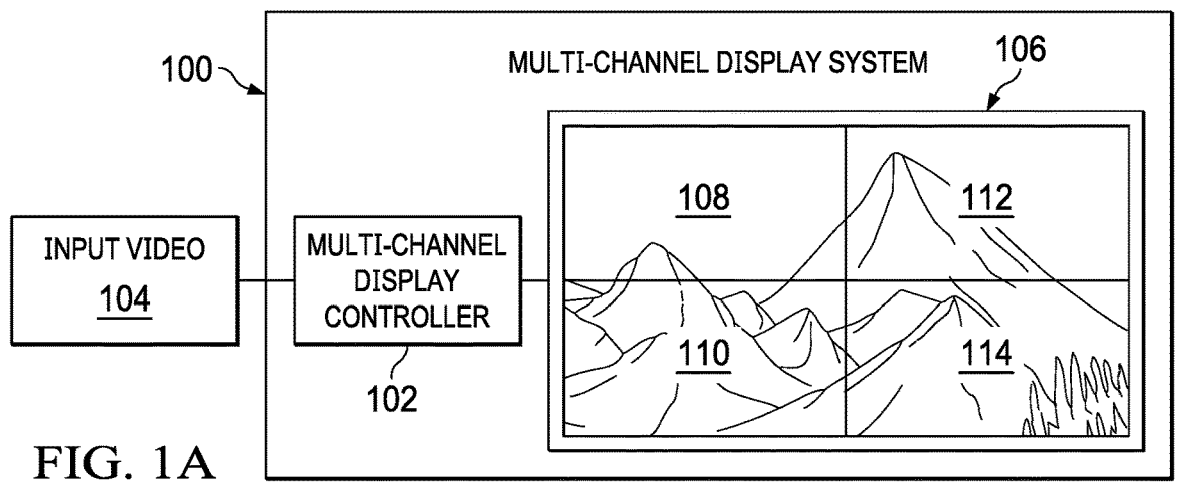
FIGS. 1A-1C are illustrations of an example multi-channel display controller in communication with example multi-channel display devices.

The drawings are not to scale. Generally, the same reference numbers in the drawing(s) and this description refer to the same or like parts. Although the drawings show layers and regions with clean lines and boundaries, some or all of these lines and/or boundaries may be idealized. In reality, the boundaries and/or lines may be unobservable, blended and/or irregular.

Some video presentation applications utilize multi-channel display systems to present and/or otherwise display video to a user using multiple display channels. Such multi-channel display systems may include multiple display controllers in communication with respective display devices to form respective display channels. The video controllers may control the presentation of display data (such as video data including one or more display frames, video frames, etc.) on the two or more display devices. For example, a near-eye display (NED), a head-mounted display (HMD), etc., may have multiple display channels. In such examples, the multiple display channels may include (i) a first display channel including a first video controller and a first display device to display the display data to a left eye of a human user and (ii) a second display channel including a second video controller and a second display device to display the display data to a right eye of the human user.

In some examples, each of the display channels may be implemented with a dedicated set of hardware including a display panel, a display controller, and an input/output (I/O) port. In such examples, the display panel may be a light emitting diode (LED) display, a liquid crystal display (LCD), a digital micromirror device (DMD), a liquid-crystal-on-silicon (LCoS) display, a phased light modulator (PLM) display, etc. In some examples, each of the dedicated set of hardware may also be implemented with a dedicated video front-end (FE) controller to provide display data to a corresponding one of the display controllers. In such examples, the additional ones of the dedicated FE controllers may increase the computational complexity of programming and configuring such a multi-channel display system as well as increase a monetary cost of the multi-channel display system by including the additional FE controllers. The additional FE controllers may also increase a physical size of the multi-channel display system and/or a power consumption of the multi-channel display system, which may reduce efficiencies in power-limited or mobile device type applications, such as a multi-channel display device operating on battery power. As video presentation applications demand multiple displays to be integrated into the same system, improvements are desired to overcome the above-described shortcomings.

In some examples, hardware that may handle providing the display data to multiple ones of the display channels may be utilized. In such examples, the display data may need to be customized prior to being received by the hardware to accommodate the providing of the display data to the multiple display channels. For example, the display data may be converted into a different data format, display frames of the display data may be adjusted in frequency, etc., and/or a combination thereof.

Examples described herein include a controller (such as a FE controller) to obtain display data and provide the display data to multiple display controllers. In some described examples, the controller provides signal(s) (such as control signal(s), control waveform(s), control pulse(s), etc.) to one(s) of the multiple display controllers to invoke and/or otherwise cause the one(s) of the multiple display controllers to display portion(s) of the display data during a time period of interest. For example, the controller may generate a first channel select waveform to cause a first display controller to display a first display frame on a first display device of a multi-channel display system. In such examples, the controller may generate a second channel select waveform to cause a second display controller to display a second display frame on a second display device of the multi-channel display system.

Advantageously, the example controller as described herein may support multi-channel display systems with fewer FE devices (such as FE controllers), reduced power consumption based on the fewer FE devices, reduced cost (e.g., bill of materials cost), and/or reduced footprint based on the size reduction achieved from having fewer FE devices. Advantageously, the example controller as described herein may achieve synchronized delivery of display data on the multiple display channels based on the signal(s) generated by the controller without additional synchronization mechanisms.

FIG. 1A is an illustration of a first example multi-channel display system 100 including an example multi-channel display controller 102 providing and/or otherwise delivering first example input video 104 to a first example multi-channel display device 106. In this example, the multi-channel display controller 102 is depicted separate from the first multi-channel display device 106. For example, the first multi-channel display system 100 may be implemented by including the multi-channel display controller 102 in a housing or other structural frame of the first multi-channel display device 106. In some examples, the first multi-channel display system 100 may be implemented by not including the multi-channel display controller 102 in a housing or other structural frame of the first multi-channel display device 106. In such examples, the multi-channel display controller 102 may be in communication with the first multi-channel display device 106 using a wired or wireless communication interface.

The first input video 104 is display data. For example, the first input video 104 may include one or more display frames (such as display data frames), video frames (such as video data frames), etc., that may be obtained and/or otherwise received by the multi-channel display controller 102 in sequence. In some examples, the multi-channel display controller 102 receives the first input video 104 or portion(s) thereof out-of-sequence and may be reorganized by the multi-channel display controller 102 prior to delivery to the first multi-channel display device 106.

The first multi-channel display device 106 is a video wall having four display channels. For example, the first multi-channel display device 106 may have four display channels 108, 110, 112, 114 including a first display channel 108, a second display channel 110, a third display channel 112, and a fourth display channel 114. Alternatively, the first multi-channel display device 106 may have fewer or more than four display channels.

The first display channel 108 may be implemented by a first display controller and a first display device (such as an LCD or LED display) and the second display channel 110 may be implemented by a second display controller and a second display device (such as an LCD or LED display). In such examples, the multi-channel display controller 102 may transmit a first display frame of the first input video 104 to the first display channel 108 for presentation to a viewer and a second display frame of the first input video 104 to the second display channel 110 for presentation to the viewer. In this example, the first display frame and the second display frame may be part of the same image to implement the video wall.

In some examples, the multi-channel display controller 102 may generate a first channel select waveform to cause the first display channel 108 to display the first display frame and a second channel select waveform to cause the second display channel 110 to display the second display frame. In some examples, the first and second display frames may be displayed at the same time. In some examples, display times of the first and second display frames may overlap. In some examples, the first display frame may be displayed prior to the second display frame.

Figure 1B:
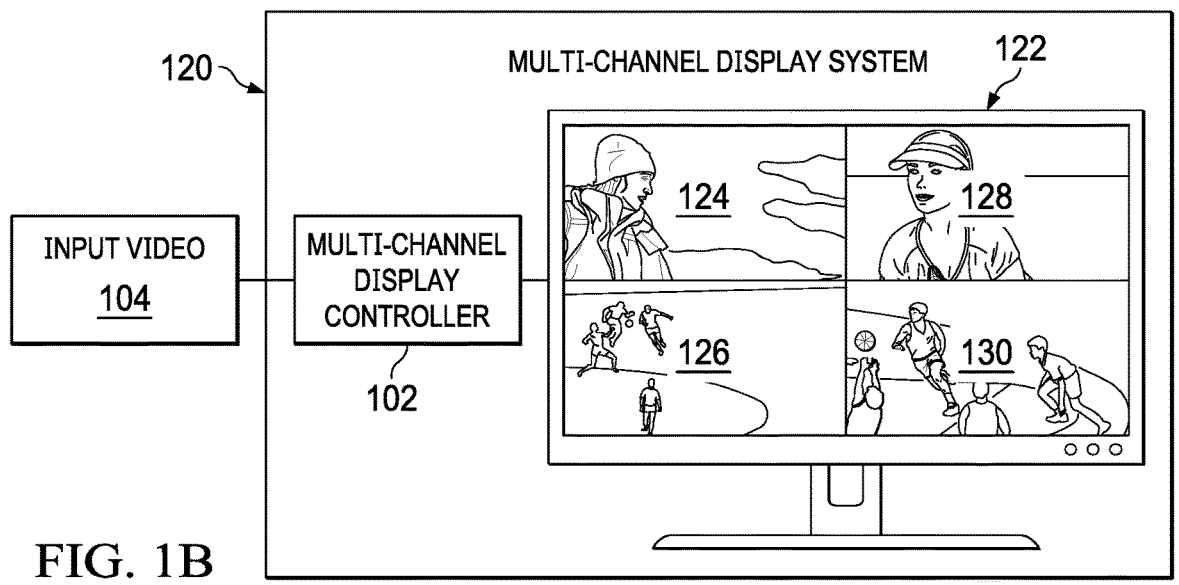

FIG. 1B is an illustration of a second example multi-channel display system 120 including the multi-channel display controller 102 of FIG. 1A providing and/or otherwise delivering the first input video 104 of FIG. 1A to a second example multi-channel display device 122. In this example, the multi-channel display controller 102 is depicted separate from the second multi-channel display device 122. For example, the second multi-channel display system 120 may be implemented by including the multi-channel display controller 102 in a housing or other structural frame of the second multi-channel display device 122. In some examples, the second multi-channel display system 120 may be implemented by not including the multi-channel display controller 102 in a housing or other structural frame of the second multi-channel display device 122. In such examples, the multi-channel display controller 102 may be in communication with the second multi-channel display device 122 using a wired or wireless communication interface.

The second multi-channel display device 122 is a multi-view monitor having four display channels. For example, the second multi-channel display device 122 may have four display channels 124, 126, 128, 130 including a first display channel 124, a second display channel 126, a third display channel 128, and a fourth display channel 130. In some examples, the output from different one(s) of the display channels 124, 126, 128, 130 may be combined using different optical architectures that results in video presentation to a viewer of one or more of the display channels 124, 126, 128, 130 based on lateral position of the viewer within the viewing area of the second multi-channel display device 122. Alternatively, the second multi-channel display device 122 may have fewer or more than four display channels.

The first display channel 124 may be implemented by a first display controller and a first display device (such as an LCD or LED display) and the second display channel 126 may be implemented by a second display controller and a second display device (such as an LCD or LED display). In such examples, the multi-channel display controller 102 may transmit a first display frame of the first input video 104 to the first display channel 124 for presentation to a user and a second display frame of the first input video 104 to the second display channel 126 for presentation to the user. In this example, the first display frame and the second display frame may be part of separate images or views to implement the multi-view monitor.

In some examples, the multi-channel display controller 102 may generate a first channel select waveform to cause the first display channel 124 to display the first display frame and a second channel select waveform to cause the second display channel 126 to display the second display frame. In some examples, the first and second display frames may be displayed at the same time. In some examples, display times of the first and second display frames may overlap. In some examples, the first display frame may be displayed prior to the second display frame.

Figure 1C:
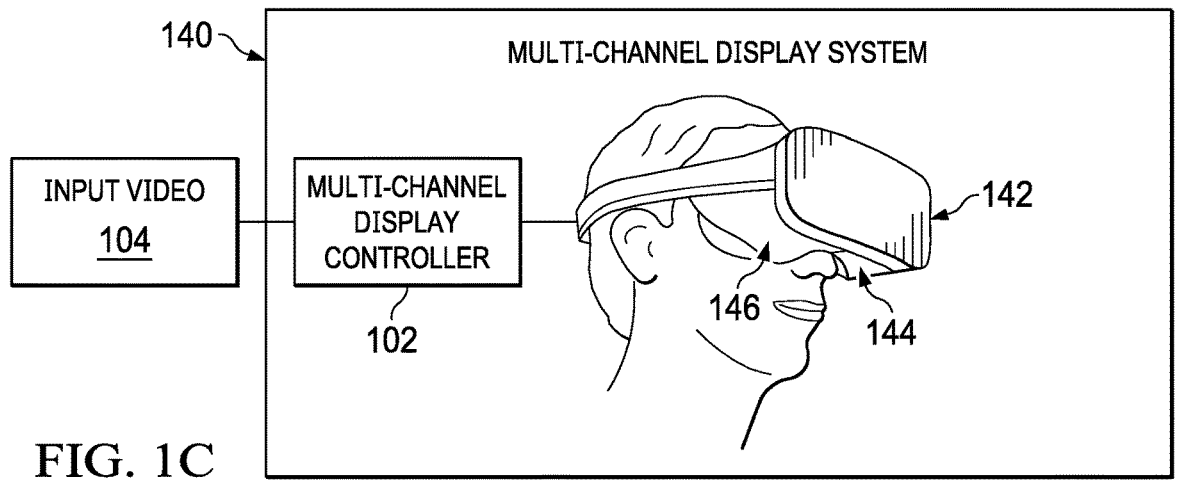

FIG. 1C is an illustration of a third example multi-channel display system 140 including the multi-channel display controller 102 of FIGS. 1A-1B providing and/or otherwise delivering the first input video 104 of FIGS. 1A and/or 1B to a third example multi-channel display device 142. In this example, the multi-channel display controller 102 is depicted separate from the third multi-channel display device 142. For example, the third multi-channel display system 140 may be implemented by including the multi-channel display controller 102 in a housing or other structural frame of the third multi-channel display device 142. In some examples, the third multi-channel display system 140 may be implemented by not including the multi-channel display controller 102 in a housing or other structural frame of the third multi-channel display device 142. In such examples, the multi-channel display controller 102 may be in communication with the third multi-channel display device 142 using a wired or wireless communication interface.

The third multi-channel display device 142 is a stereoscopic display capable of conveying depth perception to a user (such as a viewer) based on a stereopsis technique. For example, the third multi-channel display device 142 may be an augmented reality (AR) headset or a virtual reality (VR) headset. The third multi-channel display device 142 has two display channels 144, 146 including a first display channel 144 and a second display channel 146. Alternatively, the third multi-channel display device 142 may have more than two display channels.

The first display channel 144 may be implemented by a first display controller and a first display device (such as an LCD display, an LED display, a DMD, an LCoS device, a PLM device, etc.) and the second display channel 146 may be implemented by a second display controller and a second display device (such as an LCD display, an LED display, a DMD, an LCoS device, a PLM device, etc.). In such examples, the multi-channel display controller 102 may transmit a first display frame of the first input video 104 to the first display channel 144 for presentation to a left eye of a user and a second display frame of the first input video 104 to the second display channel 146 for presentation to a right eye of the user. In this example, the first display frame and the second display frame may be part of the image or view to implement the stereoscopic display.

Figure 2:
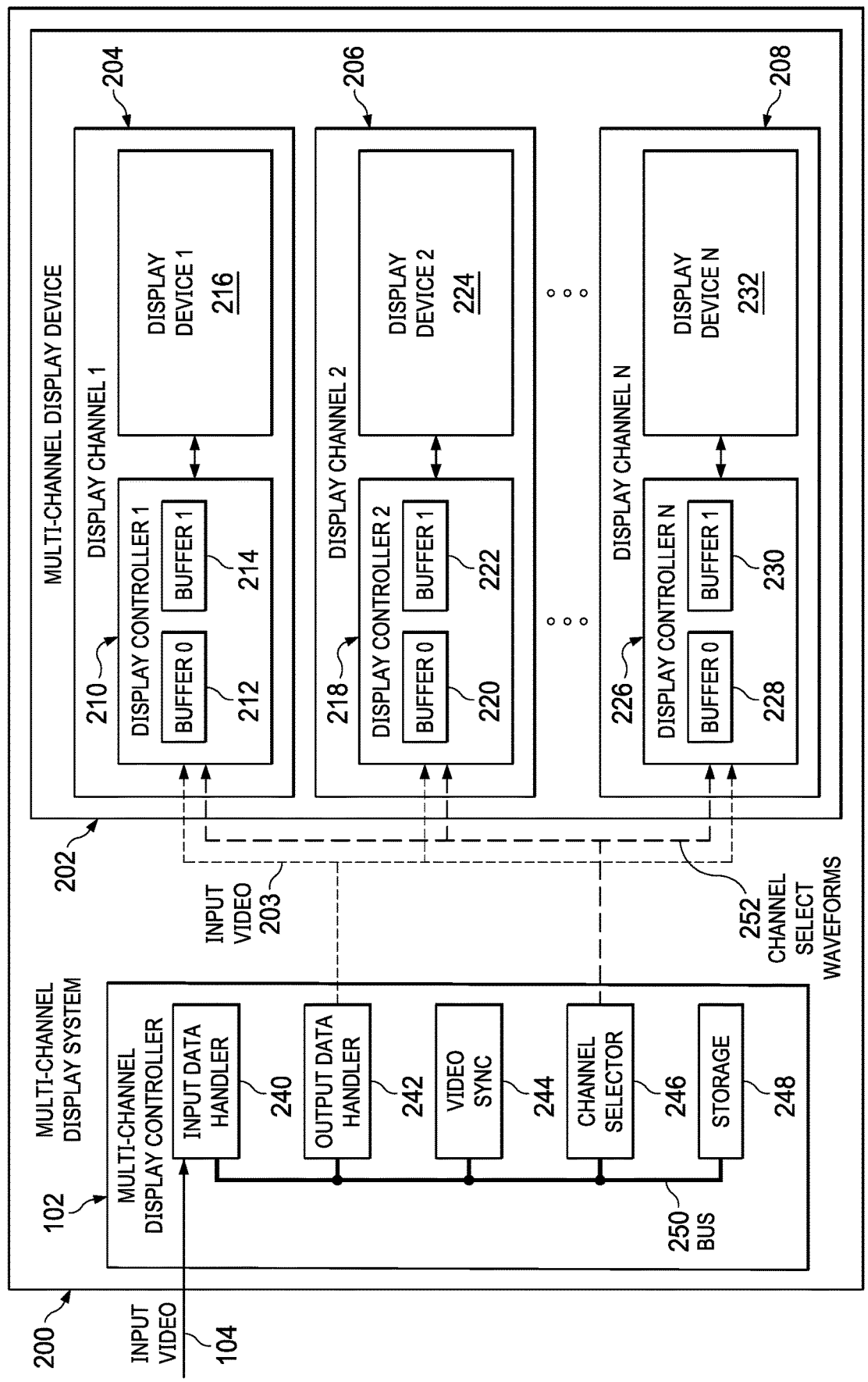
FIG. 2 is an illustration of an example implementation of the example multi-channel display controller of FIGS. 1A-1C.

In some examples, the multi-channel display controller 102 may generate a first channel select waveform to cause the first display channel 144 to display the first display frame and a second channel select waveform to cause the second display channel 146 to display the second display frame. In some examples, the first and second display frames may be displayed at the same time. In some examples, display times of the first and second display frames may overlap. In some examples, the first display frame may be displayed prior to the second display frame, FIG. 2 is an illustration of an example implementation of a multi-channel display system 200. For example, the multi-channel display system 200 may implement the first multi-channel display system 100 of FIG. 1A, the second multi-channel display system 120 of FIG. 1B, and/or the third multi-channel display system 140 of FIG. 1C. For example, the multi-channel display system 200 may implement a video wall, a multi-view monitor, a stereoscopic display, a monitor with multiple display surfaces, a multi-focal plane display, etc.

The multi-channel display system 200 of FIG. 2 includes an example implementation of the multi-channel display controller 102 of FIGS. 1A-1C and an example multi-channel display device 202. In some examples, the multi-channel display device 202 may implement the first multi-channel display device 106 of FIG. 1A, the second multi-channel display device 122 of FIG. 1B, and/or the third multi-channel display device 142 of FIG. 1C.

The multi-channel display device 202 includes multiple example display channels 204, 206, 208 that may be controlled the multi-channel display controller 102. The display channels 204, 206, 208 include a first example display channel (DISPLAY CHANNEL 1) 204, a second example display channel (DISPLAY CHANNEL 2) 206, and a third example display channel (DISPLAY CHANNEL N) 208. Alternatively, fewer or more display channels than those depicted in FIG. 2 may be used (such as two display channels, three display channels, four display channels, ten display channels, etc.). For example, the multi-channel display device 202 may be implemented by at least four display channels and four display controllers.

The first display channel 204 is implemented by a first example display controller (DISPLAY CONTROLLER 1) 210, which includes example buffers 212, 214, and a first example display device (DISPLAY DEVICE 1) 216. Output terminal(s) of the first display controller 210 is/are coupled to input terminal(s) of the first display device 216.

The second display channel 206 is implemented by a second example display controller (DISPLAY CONTROLLER 2) 218, which includes example buffers 220, 222, and a second example display device (DISPLAY DEVICE 2) 224. Output terminal(s) of the second display controller 218 is/are coupled to input terminal(s) of the second display device 224.

The third display channel 208 is implemented by a third example display controller (DISPLAY CONTROLLER N) 226, which includes example buffers 228, 230, and a third example display device (DISPLAY DEVICE N) 232. Output terminal(s) of the third display controller 226 is/are coupled to input terminals) of the third display device 232.

One or more of the display controllers 210, 218, 226 are hardware. For example, one or more of the display controllers 210, 218, 226 may be implemented by hardware, software, firmware and/or any combination of hardware, software and/or firmware. In such examples, one or more of the display controllers 210, 218, 226 may be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) (such as field programmable gate arrays (FPGAs)).

The buffers 212, 214 implemented by the first display controller 210 include a first example buffer (BUFFER 0) 212 and a second example buffer (BUFFER 1) 214. The buffers 220, 222 implemented by the second display controller 218 include a first example buffer (BUFFER 0) 220 and a second example buffer (BUFFER 1) 222. The buffers 228, 230 implemented by the third display controller 226 include a first example buffer (BUFFER 0) 228 and a second example buffer (BUFFER 1) 230. One or more of the buffers 212, 214, 220, 222, 228, 230 may be implemented by hardware, software, firmware and/or any combination of hardware, software and/or firmware. For example, one or more of the buffers 212, 214, 220, 222, 228, 230 may be implemented by read-only memory (ROM) (such as electrically erasable programmable (EEPROM) memory), flash memory, non-volatile memory, volatile memory (such as Synchronous Dynamic Random Access Memory (SDRAM), Dynamic Random Access Memory (DRAM), RAMBUS® Dynamic Random Access Memory (RDRAM®), and/or any other type of random access memory device), etc.

One or more of the display devices 216, 224, 232 are hardware. For example, one or more of the display devices 216, 224, 232 may be implemented by hardware, software, firmware and/or any combination of hardware, software and/or firmware. In such examples, one or more of the display devices 216, 224, 232 may be implemented by an LED display, an organic light emitting diode (OLED) display, an LCD display, a cathode ray tube (CRT) display, an in-place switching (IPS) display, a touchscreen, a spatial light modulator (such as a DMD or an LCoS display), a PLM display, etc.

One(s) of the display controllers 210, 218, 226 obtain second example input video 203 from the multi-channel display controller 102 for presentation on corresponding one(s) of the display devices 216, 224, 232. The multi-channel display controller 102 of FIG. 2 includes an example input data handler 240, an example output data handler 242, an example video sync 244, an example channel selector 246, and example storage 248. In this example, the input data handler 240, the output data handler 242, the video sync 244, the channel selector 246, and the storage 248 are in communication with one(s) of each other via an example bus 250. In some examples, the bus 250 is representative of and/or otherwise is implemented by one or more interfaces (such as data interfaces, communication interfaces, etc.). For example, the bus 250 may be implemented by at least one of an Inter-Integrated Circuit (I2C) bus, a Serial Peripheral Interface (SPI) bus, a Peripheral Component Interconnect (PCI) bus, an Ethernet interface, a Universal Serial Bus (USB) interface, etc.

The multi-channel display controller 102 includes the input data handler 240 to receive and/or otherwise obtain the first input video 104 from a data source, a video source, etc. For example, the input data handler 240 may obtain audio data, video data, etc., and/or a combination thereof from the data source. In some examples, the data source may be obtained from a High-Definition Multimedia Interface (HDMI), a Wireless Fidelity (Wi-Fi) interface, a Bluetooth interface, an Ethernet interface, a USB interface, and/or any other audio and/or video interface.

In some examples, the input data handler 240 may process the first input video 104. For example, the input data handler 240 may compress or decompress the first input video 104, encrypt or decrypt the first input video 104, etc. In some examples, the input data handler 240 may identify a frequency of data frames (such as display frames, video frames, etc.) of the first input video 104. In some examples, the input data handler 240 may identify a format of the first input video 104 or other characteristics of the first input video 104.

The multi-channel display controller 102 includes the output data handler 242 to transmit, provide, and/or otherwise deliver the second input video 203 to one(s) of the display controllers 210, 218, 226. For example, the output data handler 242 may transmit audio data, video data, etc., and/or a combination thereof to the multi-channel display device 202. In some examples, the output data handler 242 may process the first input video 104 into the second input video 203 prior to delivering the second input video 203 to one(s) of the display controllers 210, 218, 226. For example, the output data handler 242 may compress or decompress the first input video 104, encrypt or decrypt the first input video 104, etc., to generate the second input video 203. In some examples, the output data handler 242 may adjust (such as increase or decrease) a frequency of data frames (such as display frames, video frames, etc.) of the first input video 104 to generate the second input video 203. In some examples, the output data handler 242 may convert a format of the first input video 104 into a different format to generate the second input video 203. For example, the output data handler 242 may convert a first video format (e.g., HDMI) of the first input video 104 into a second video format (e.g., Red/Green/Blue (RGB) video data format, YPbPr video data format, etc.) of the second input video 203.

The multi-channel display controller 102 includes the video sync 244 to generate synchronization pulses (such as video synchronization (VSYNC) pulses). In some examples, the video sync 244 may generate a VSYNC pulse in response to obtaining a VSYNC pulse from the data source of the first input video 104. In some examples, the video sync 244 may generate a first VSYNC pulse based on the first input video 104. For example, the video sync 244 may determine that a first display frame of the first input video 104 has been received by the input data handler 240. For example, the video sync 244 may generate a first VSYNC pulse based on the determination that the first display frame of the first input video 104 has been received by the input data handler 240. The video sync 244 may determine that a second display frame of the first input video 104 has been received by the input data handler 240. The video sync 244 may generate a second VSYNC pulse after the first VSYNC pulse based on the determination that the first display frame of the first input video 104 has been received by the input data handler 240 and/or the second display frame of the first input video 104 has been received by the input data handler 240.

The multi-channel display controller 102 includes the channel selector 246 to generate example channel select waveforms 252 select one(s) of the display channels 204, 206, 208 on which to display the second input video 203 or portion(s) thereof on respective one(s) of the display devices 216, 224, 232. In some examples, the channel selector 246 effectuates a pipelined display technique. For example, the channel selector 246 may generate a first one of the channel select waveforms 252 having a rising edge and a falling edge. In such examples, in response to generating the rising edge, the channel selector 246 may cause the first display device 216 to display a first display frame of the second input video 203 at a first time. In some such examples, in response to generating the falling edge, the channel selector 246 may cause the second display device 224 to display a second display frame of the second input video 203 at a second time after the first time.

In some examples, the channel selector 246 effectuates a delayed display technique. For example, the channel selector 246 may generate a second one of the channel select waveforms 252 having a rising edge and a falling edge. In such examples, in response to generating the rising edge, the channel selector 246 may cause the first display device 216 to display dark video data, such as a first dark display frame (such as a null display frame, a display frame including only black pixels, etc.) of the second input video 203 at a first time. In some such examples, in response to generating the falling edge, the channel selector 246 may cause the first display device 216 to display a first display frame of the second input video 203 and the second display device 224 to display a second display frame of the second input video 203 at a second time after the first time.

In some examples, the channel selector 246 select(s) the one(s) of the display channels 204, 206, 208 by generating the channel select waveforms 252. For example, the channel selector 246 may generate a third one of the channel select waveforms 252 having a rising edge and a falling edge. In such examples, in response to the channel selector 246 generating the rising edge, the channel selector 246 may select the first display channel 204 on which to display a first display frame of the second input video 203. In some such examples, in response to the channel selector 246 generating the falling edge, the channel selector 246 may select the second display channel 206 on which to display a second display frame of the second input video 203.

In some examples, the channel selector 246 determines one(s) of the buffers 212, 214, 220, 222, 228, 230 in which to store portion(s) of the second input video 203 by generating the channel select waveform(s) 252. For example, the channel selector 246 may generate a fourth one of the channel select waveforms 252 having a rising edge and a falling edge. In such examples, in response to the channel selector 246 generating the rising edge, the channel selector 246 may select first one(s) of the buffers 212, 214, 220, 222, 228, 230 to store a first display frame of the second input video 203. For example, in response to obtaining the rising edge, the first display controller 210 may store the first display frame in the first buffer 212.

In some examples, in response to the channel selector 246 generating the falling edge of the fourth one of the channel select waveforms 252, the channel selector 246 may select second one(s) of the buffers 212, 214, 220, 222, 228, 230 to store a second display frame of the second input video 203. For example, in response to obtaining the falling edge, the first display controller 210 may store the second display frame in the second buffer 214.

The multi-channel display controller 102 includes the storage 248 to record data. For example, the storage 248 may record the second input video 203 or portion(s) thereof. The storage 248 may be implemented by a volatile memory (such as an SDRAM, DRAM, RDRAM, etc.) and/or a non-volatile memory (such as ROM, EEPROM, flash memory, etc.). The storage 248 may additionally or alternatively be implemented by one or more double data rate (DDR) memories, such as DDR, DDR2, DDR3, DDR4, mobile DDR (mDDR), etc. The storage 248 may additionally or alternatively be implemented by one or more mass storage devices such as hard disk drive(s), compact disk drive(s), digital versatile disk drive(s), solid-state disk drive(s), etc. While in the illustrated example the storage 248 is illustrated as a single storage, the storage 248 may be implemented by any number and/or type(s) of storage. Furthermore, the data stored in the storage 248 may be in any data format such as, for example, binary data, comma delimited data, audio data, video data, tab delimited data, etc.

While an example manner of implementing the multi-channel display controller 102 of FIGS. 1A-1C is illustrated in FIG. 2, one or more of the elements, processes and/or devices illustrated in FIG. 2 may be combined, divided, re-arranged, omitted, eliminated and/or implemented in any other way. Further, the example input data handler 240, the example output data handler 242, the example video sync 244, the example channel selector 246, the example storage 248, and/or, more generally, the example multi-channel display controller 102 of FIGS. 1A-1C may be implemented by hardware, software, firmware and/or any combination of hardware, software and/or firmware. Thus, for example, any of the example input data handler 240, the example output data handler 242, the example video sync 244, the example channel selector 246, the example storage 248, and/or, more generally, the example multi-channel display controller 102 could be implemented by one or more analog or digital circuit(s), logic circuits, programmable processor(s), programmable controller(s), GPU(s), DSP(s), ASIC(s), PLD(s), and/or FPLD(s). When reading any of the apparatus or system claims of this patent to cover a purely software and/or firmware implementation, at least one of the example input data handler 240, the example output data handler 242, the example video sync 244, the example channel selector 246, and/or the example storage 248 is/are hereby expressly defined to include a non-transitory computer readable storage device or storage disk such as a memory, a digital versatile disk (DVD), a compact disk (CD), a Blu-ray disk, etc. including the software and/or firmware. Further still, the example multi-channel display controller 102 of FIGS. 1A-1C may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (such as wired) communication and/or constant communication, but rather additionally includes selective communication at periodic intervals, scheduled intervals, aperiodic intervals, and/or one-time events.

Figure 3:
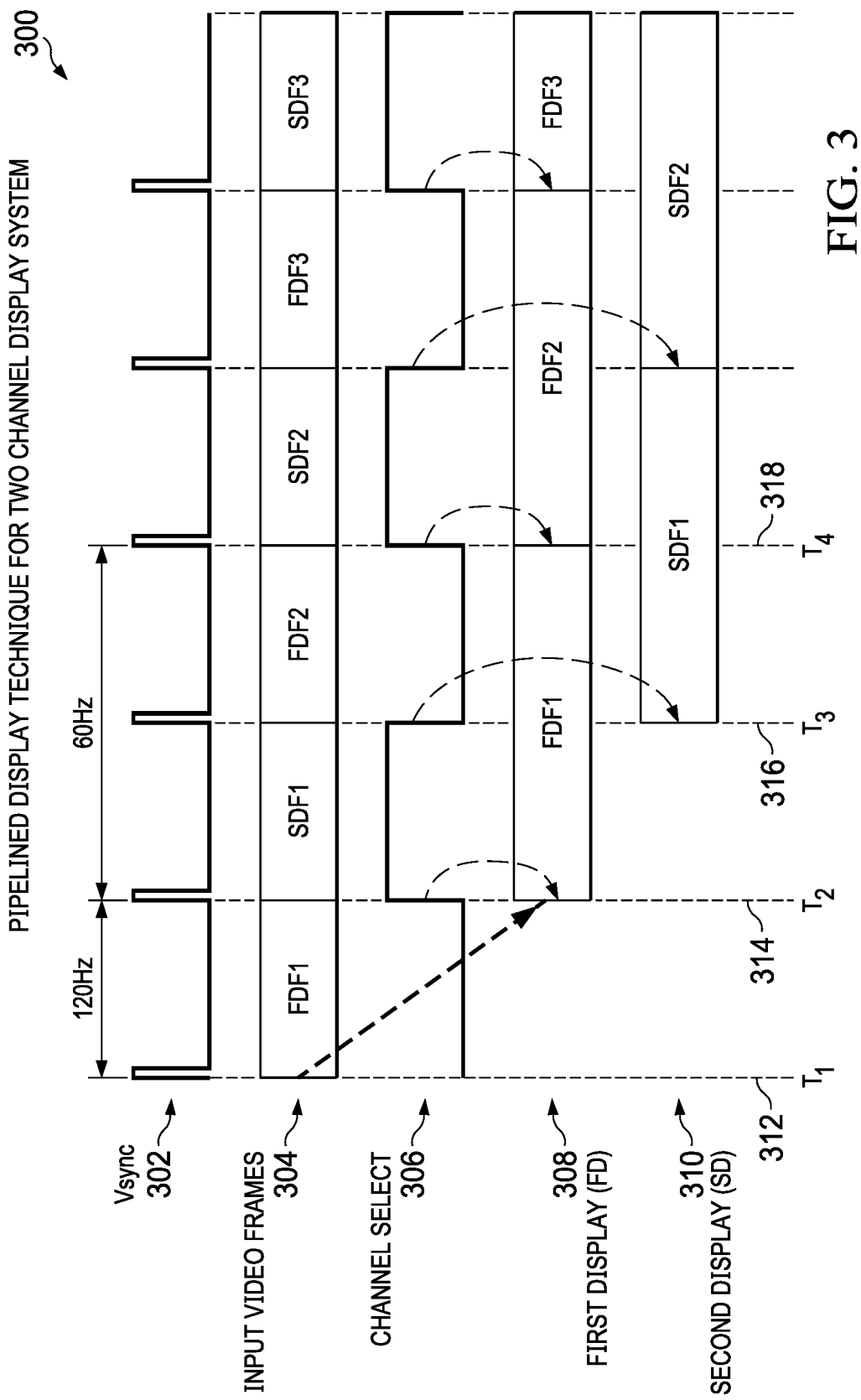
FIG. 3 is a timing diagram corresponding to an example pipelined display technique for a two channel display system.

FIG. 3 is a first timing diagram 300 corresponding to an example pipelined display technique for a two channel display system. The first timing diagram 300 includes an example video synchronization waveform (VSYNC) 302, an example input video frames waveform 304, an example channel select waveform 306, a first example display waveform 308, and a second example display waveform 310. The first timing diagram 300 may implement example operation of a two channel display system, such as the third multi-channel display system 140 of FIG. 1C. For example, the first display waveform 308 may correspond to first video data to be presented to a left eye display of an AR or YR headset and the second display waveform 310 may correspond to second video data to be presented to a right eye display of the AR or VR headset. Alternatively, the first display waveform 308 and the second display waveform 310 may be used for any other type of two-channel display system.

The video synchronization waveform 302 may implement video synchronization pulses generated by the multi-channel display controller 102 of FIGS. 1A-2. For example, the video sync 244 (FIG. 2) may generate the VSYNC pulses of the video synchronization waveform 302. The input video frames waveform 304 may implement display frames, video frames, etc., included in the second input video 203 of FIG. 2. For example, the output data handler 242 (FIG. 2) may output the display frames, the video frames, etc., of the input video frame waveform 304. The channel select waveform 306 may implement the channel select waveforms 252 of FIG. 2. For example, the channel selector 246 (FIG. 2) may generate channel select waveforms of the channel select waveform 306. The first display waveform 308 may implement first display data displayed and/or otherwise presented on the first display channel 144 of FIG. 1C. For example, the first display channel 204 (FIG. 2) may display the first display data of the first display waveform 308 on the first display device 216 (FIG. 2). The second display waveform 310 may implement second display data displayed and/or otherwise presented on the second display channel 146 of FIG. 1C. For example, the second display channel 206 (FIG. 2) may display the second display data of the second display waveform 310 on the second display device 224 (FIG. 2).

At a first example time ($T_1$) 312, the video sync 244 generates a rising edge of a first VSYNC pulse of the video synchronization waveform 302. In response to the rising edge of the first VSYNC pulse at the first time 312, the output data handler 242 provides and/or otherwise outputs a first input video frame, which is represented as first display frame one (FDF1) in FIG. 2, to the display controllers 210, 218, 226 (FIG. 2) including the first display controller 210 (FIG. 2). For example, FDF1 may correspond to a first video frame to be implemented by the first display waveform 308. In some examples, the first display controller 210 may store FDF1 in one(s) of the buffers 212, 214 (FIG. 2) of the first display controller 210.

At a second example time ($T_2$) 314, the video sync 244 generates a rising edge of a second VSYNC pulse of the video synchronization waveform 302. In response to the rising edge of the second VSYNC pulse at the second time 314, the output data handler 242 outputs a second input video frame, which is represented as second display frame one (SDF1) in FIG. 2, to the display controllers 210, 218, 226 including the second display controller 218 (FIG. 2). For example, SDF1 may correspond to a first video frame to be implemented by the second display waveform 310. In some examples, the second display controller 218 may store SDF1 in one(s) of the buffers 220, 222 (FIG. 2) of the second display controller 218. In this example, the time difference between the first time 312 and the second time 314 is a time period that corresponds to a 120 Hertz (Hz) frequency. For example, the video sync 244 may generate the VSYNC pulses and/or the output data handler 242 may output the input video frames of the input video frame waveform 304 at 120 Hz frequency.

In response to the rising edge of the second VSYNC pulse at the second time 314, the channel selector 246 (FIG. 2) generates a rising edge of a first channel select waveform of the channel select waveform 306. In response to the rising edge of the first channel select waveform, the first display controller 210 instructs the first display device 216 (FIG. 2) to display FDF1 at the second time 314.

At a third example time ($T_3$) 316, the video sync 244 generates a rising edge of a third VSYNC pulse of the video synchronization waveform 302. In response to the rising edge of the third VSYNC pulse at the third time 316, the output data handler 242 outputs FDF2 to the display controllers 210, 218, 226 including the first display controller 210. In some examples, the first display controller 210 may store FDF2 in one(s) of the buffers 212, 214 of the first display controller 210. At the third time 316, the channel selector 246 generates a falling edge of the first channel select waveform. In response to the falling edge of the first channel select waveform, the second display controller 218 instructs the second display device 224 (FIG. 2) to display SDF1 at the third time 316.

At a fourth example time ($T_4$) 318, the video sync 244 generates a rising edge of a fourth VSYNC pulse of the video synchronization waveform 302. In response to the rising edge of the fourth VSYNC pulse at the fourth time 318, the output data handler 242 delivers SDF2 to the display controllers 210, 218, 226 including the second display controller 218. In some examples, the second display controller 218 may store SDF2 in one(s) of the buffers 220, 222 of the second display controller 218.

In response to the rising edge of the fourth VSYNC pulse at the fourth time 318, the channel selector 246 generates a rising edge of a second channel select waveform of the channel select waveform 306. In response to the rising edge of the second channel select waveform, the first display controller 210 instructs the first display device 216 to display FDF2 at the fourth time 318. In this example, the first display device 216 displays FDF1 from the second time 314 until the fourth time 318. In this example, FDF1 is displayed at 60 Hz frequency. For example, the multi-channel display controller 102 may control display of the input video frames (such as FDF1, SDF1, FDF2, etc.) at a frequency half of the VSYNC pulses. Alternatively, the multi-channel display controller 102 may control display of the input video frames at any other frequency. Advantageously, the multi-channel display controller 102 may effectuate the display of input video frames of the input video frame waveform 304 on multiple display devices using a pipelined display technique as illustrated in the first timing diagram 300.

Figure 4:
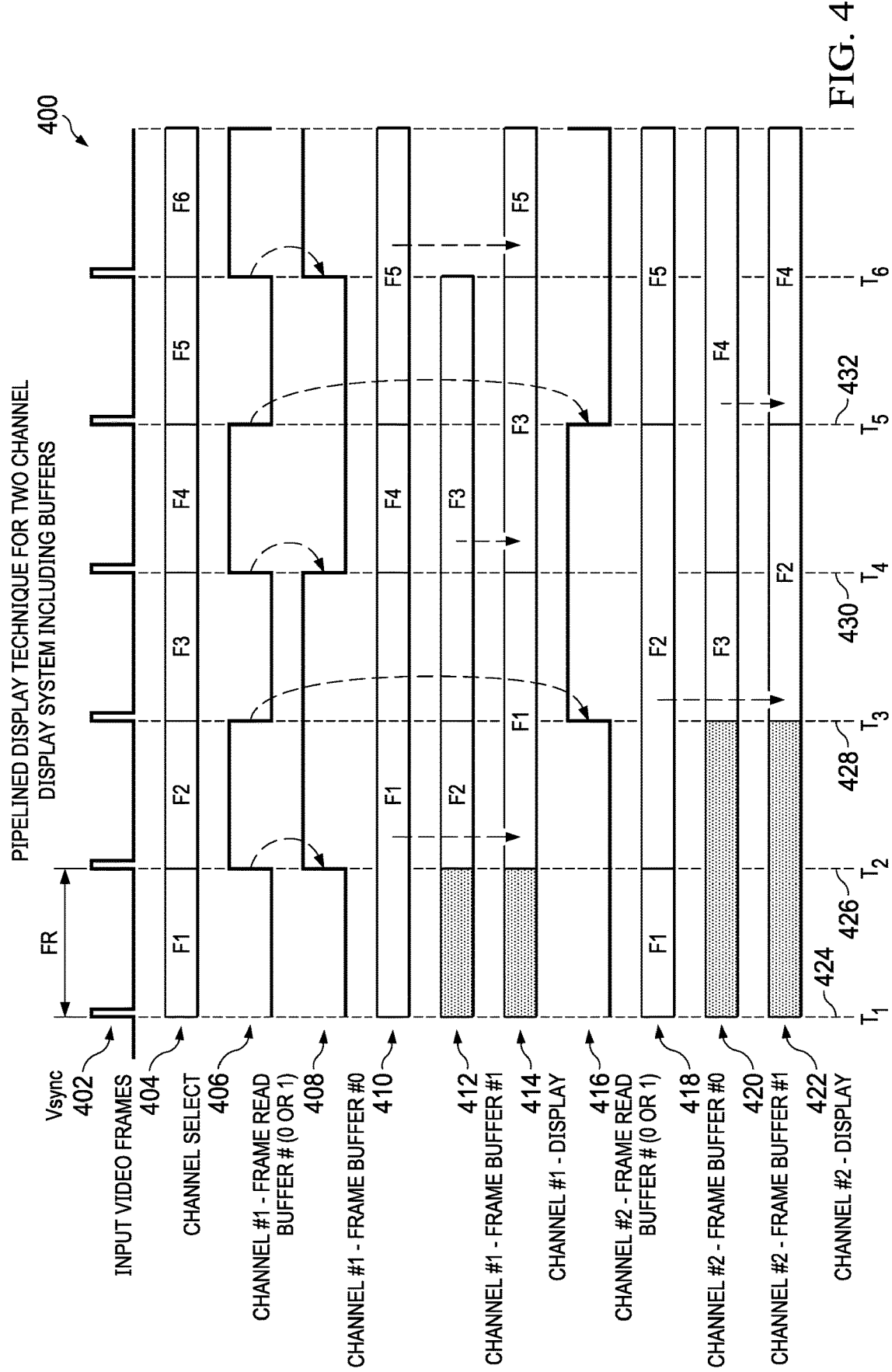
FIG. 4 is another timing diagram corresponding to an example pipelined display technique for a two channel display system.

FIG. 4 is a second timing diagram 400 corresponding to an example pipelined display technique for a two channel display system using buffers. The second timing diagram 400 includes an example video synchronization waveform (VSYNC) 402, an example input video frames waveform 404, an example channel select waveform 406, a first example buffer select waveform (CHANNEL #1-FRAME READ BUFFER # (0 OR 1) 408, first data stored in a first example buffer (CHANNEL #1-FRAME BUFFER #0) 410, second data stored in a second example buffer (CHANNEL #1-FRAME BUFFER #1) 412, a first example display channel (CHANNEL #1-DISPLAY) 414, a second example buffer select waveform (CHANNEL #2-FRAME READ BUFFER # (0 OR 1) 416, third data stored in a third example buffer (CHANNEL #2-FRAME BUFFER #0) 418, fourth data stored in a fourth example buffer (CHANNEL #2-FRAME BUFFER #1) 420, and a second example display channel (CHANNEL #2-DISPLAY) 422. The second timing diagram 400 may implement example operation of a two channel display system, such as the third multi-channel display system 140 of FIG. 1C. For example, the illustrations of the first buffer 410, the second buffer 412, the third buffer 418, and the fourth buffer 420 in FIG. 4 are representative of data, such as one or more video frames, that are stored in the respective buffers with respect to time. For example, F1 may be stored in the first buffer 410 from a first example time ($T_1$) 424 until a fourth example time ($T_4$) 430.

The video synchronization waveform 402 may implement video synchronization pulses generated by the multi-channel display controller 102 of FIGS. 1A-2. For example, the video sync 244 (FIG. 2) may generate the VSYNC pulses of the video synchronization waveform 402. The input video frames waveform 404 may implement display frames, video frames, etc., included in the second input video 203 of FIG. 2. For example, the output data handler 242 (FIG. 2) may output the display frames, the video frames, etc., of the input video frame waveform 404. The channel select waveform 406 may implement the channel select waveforms 252 of FIG. 2. For example, the channel selector 246 (FIG. 2) may generate channel select waveforms of the channel select waveform 406.

The first buffer select waveform 408 may be implemented by and/or otherwise generated by ones) of the display controllers 210, 218, 226 of FIG. 2. For example, the first display controller 210 may generate the first buffer select waveform 408 based on the channel select waveform 406. In such examples the first display controller 210 may assert and deassert the first buffer select waveform 408 in response to an assertion of the channel select waveform 406.

In some examples, the first display controller 210 may select a buffer from which to display a stored frame based on the first buffer select waveform 408. In such examples, the first display controller 210 may select a frame stored in the first buffer 410 (such as the first buffer 212) to display on the first display device 216 based on the first buffer select waveform 408 being asserted. In some examples, the first display controller 210 may select a frame stored in the second buffer 412 (such as the second buffer 214) to display on the first display device 216 being deasserted.

The first buffer 410 may be implemented by the first buffer 212 of the first display controller 210. The second buffer 412 may be implemented by the second buffer 214 of the first display controller 210. The first display channel 414 may be implemented by the first display channel 144 of FIG. 1C, the first display channel 204 of FIG. 2, etc. For example, the first display channel 414 may display first display data of the first display channel 414 on the first display device 216 (FIG. 2).

The second buffer select waveform 416 may be implemented by and/or otherwise generated by one(s) of the display controllers 210, 218, 226 of FIG. 2. For example, the second display controller 218 may generate the second buffer select waveform 416 based on the channel select waveform 406. In such examples the second display controller 218 may assert and deassert the second buffer select waveform 416 in response to a deassertion of the channel select waveform 406.

In some examples, the second display controller 218 may select a buffer from which to display a stored frame based on the second buffer select waveform 416. In such examples, the second display controller 218 may select a frame stored in the third buffer 418 (such as the first buffer 220) to display on the second display device 224 based on the second buffer select waveform 416 being asserted. In some examples, the second display controller 218 may select a frame stored in the fourth buffer 420 (such as the second buffer 222) to display on the second display device 224 being deasserted.

The third buffer 418 may be implemented by the first buffer 220 of the second display controller 218. The fourth buffer 420 may be implemented by the second buffer 222 of the second display controller 218. The second display channel 422 may be implemented by the second display channel 146 of FIG. 1C, the second display channel 206 of FIG. 2, etc. For example, the second display channel 422 may display second display data of the second display channel 422 on the second display device 224 (FIG. 2).

At a first example time ($T_1$) 424 of the second timing diagram 400, the video sync 244 generates a rising edge of a first VSYNC pulse. At the first time 424, the output data handler 242 outputs a first frame (F1) (such as a display frame, a video frame, etc.) to the display controllers 210, 218, 226 including the first display controller 210 and the second display controller 218. At the first time 424, the first display controller 210 stores F1 in the first buffer 410 (such as the first buffer 212) and the second display controller 218 stores F1 in the third buffer 418 (such as the first buffer 220).

At a second example time ($T_2$) 426 of the second timing diagram 400, the video sync 244 generates a rising edge of a second VSYNC pulse of the video synchronization waveform 402. At the second time 426, the output data handler 242 outputs a second frame (F2) to the display controllers 210, 218, 226 including the first display controller 210 and the second display controller 218. For example, the first display controller 210 may store F2 in the second buffer 412 and the second display controller 218 may store F2 in the third buffer 418 at the second time 426.

At the second time 426, in response to the rising edge of the second VSYNC pulse, the channel selector 246 asserts a first instance of the channel select waveform 406 by generating a rising edge of the channel select waveform 406. At the second time 426, in response to the assertion of the channel select waveform 406, the first display controller 210 asserts a first buffer select signal of the first buffer select waveform 408 by generating a rising edge of the first buffer select signal. At the second time 426, in response to the assertion of the first buffer select signal, the first display controller 210 selects F1 stored in the first buffer 410 to display on the first display channel 414.

At a third example time ($T_3$) 428 of the second timing diagram 400, the video sync 244 generates a rising edge of a third VSYNC pulse of the video synchronization waveform 402. At the third time 428, the output data handler 242 outputs a third frame (F3) to the display controllers 210, 218, 226 including the first display controller 210 and the second display controller 218. For example, the first display controller 210 may store F3 in the second buffer 412 and the second display controller 218 may store F3 in the fourth buffer 420 at the third time 428. In some examples, the first display controller 210 may overwrite F2 stored in the second buffer 412 with F3 at the third time 428.

At the third time 428, in response to the rising edge of the third VSYNC pulse, the channel selector 246 deasserts the channel select waveform 406 by generating a falling edge of the channel select waveform 406. At the third time 428, in response to the deassertion of the channel select waveform 406, the first display controller 210 maintains the first buffer select signal at the asserted level. At the third time 428, in response to the deassertion of the channel select waveform 406, the first display controller 210 continues to select F1 stored in the first buffer 410 to display on the first display channel 414.

At the third time 428, in response to the falling edge of the channel select waveform 406, the second display controller 218 asserts the second buffer select waveform 416. At the third time 428, in response to the assertion of the second buffer select waveform 416, the second display controller 218 selects F2 stored in the third buffer 418 to display on the second display channel 422.

At a fourth example time ($T_4$) 430 of the second timing diagram 400, the video sync 244 asserts and/or otherwise outputs a rising edge of a fourth VSYNC pulse of the video synchronization waveform 402. At the fourth time 430, the output data handler 242 outputs a fourth frame (F4) to the display controllers 210, 218, 226 including the first display controller 210 and the second display controller 218.

At the fourth time 430, in response to the rising edge of the fourth VSYNC pulse, the channel selector 246 asserts the channel select waveform 406. At the fourth time 430, in response to the assertion of the channel select waveform 406, the first display controller 210 deasserts the first buffer select signal. At the fourth time 430, in response to the deassertion of the first buffer select signal, the first display controller 210 selects F3 stored in the second buffer 412 to display on the first display channel 414.

At the fourth time 430, in response to the rising edge of the channel select waveform 406, the second display controller 218 maintains the second buffer select waveform 416 at the asserted level. At the fourth time 430, in response to the assertion of the second buffer select waveform 416, the second display controller 218 continues to select F2 stored in the third buffer 418 to display on the second display channel 422.

At a fifth example time ($T_5$) 432 of the second timing diagram 400, the video sync 244 generates a rising edge of a fifth VSYNC pulse of the video synchronization waveform 402. At the fifth time 432, the output data handler 242 outputs a fifth frame (F5) to the display controllers 210, 218, 226 including the first display controller 210 and the second display controller 218.

At the fifth time 432, in response to the rising edge of the fifth VSYNC pulse, the channel selector 246 deasserts the channel select waveform 406. At the fifth time 432, in response to the deassertion of the channel select waveform 406, the first display controller 210 maintains the first buffer select waveform 408 at the deasserted level. At the fifth time 432, in response to the deassertion of the first buffer select waveform 408, the first display controller 210 continues to select F3 stored in the second buffer 412 to display on the first display channel 414.

At the fifth time 432, in response to the falling edge of the channel select waveform 406, the second display controller 218 deasserts the second buffer select waveform 416. At the fifth time 432, in response to the deassertion of the second buffer select waveform 416, the second display controller 218 selects F4 stored in the fourth buffer 420 to display on the second display channel 422. Advantageously, the multi-channel display controller 102 may achieve the display of input video frames of the input video frame waveform 404 on multiple display channels using a pipelined display technique as illustrated in the second timing diagram 400.

Figure 5:
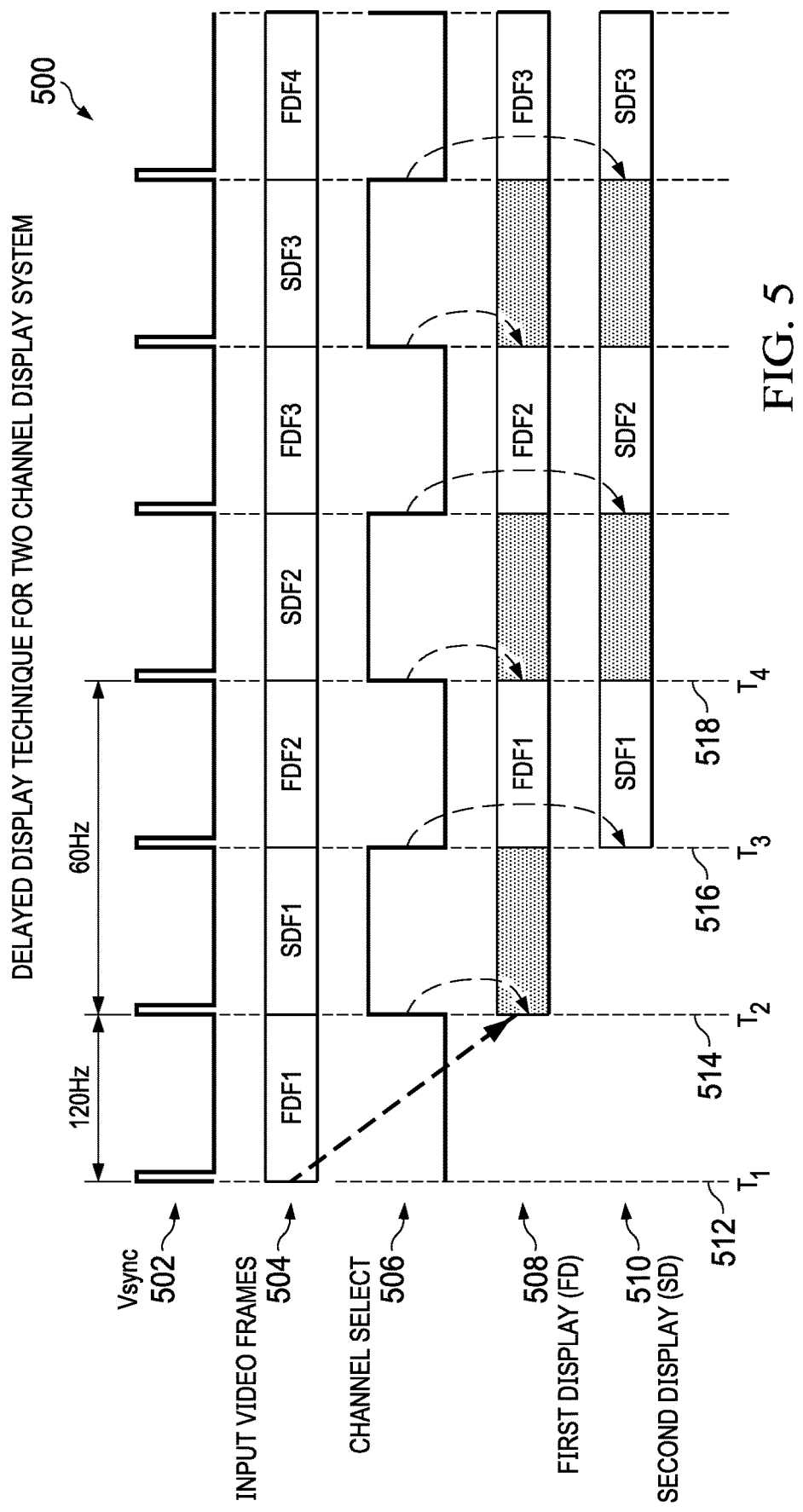
FIG. 5 is a timing diagram corresponding to an example delayed display technique for a two channel display system.

FIG. 5 is a third timing diagram 500 corresponding to an example delayed display technique for a two channel display system. The third timing diagram 500 includes an example video synchronization waveform (VSYNC) 502, an example input video frames waveform 504, an example channel select waveform 506, a first example display waveform 508, and a second example display waveform 510. The third timing diagram 500 may implement example operation of a two channel display system, such as the third multi-channel display system 140 of FIG. 1C. In some examples, the first display waveform 508 may correspond to first video data to be presented to a left eye display of an AR or VR headset and the second display waveform 510 may correspond to second video data to be presented to a right eye display of the AR or VR headset. Alternatively, the first display waveform 508 and the second display waveform 510 may be used for any other type of two-channel display system.

The video synchronization waveform 502 may implement video synchronization pulses generated by the multi-channel display controller 102 of FIGS. 1A-2. For example, the video sync 244 (FIG. 2) may generate the VSYNC pulses of the video synchronization waveform 502. The input video frames waveform 504 may implement display frames, video frames, etc., included in the second input video 203 of FIG. 2. For example, the output data handler 242 (FIG. 2) may output the display frames, the video frames, etc., of the input video frame waveform 504. The channel select waveform 506 may implement the channel select waveforms 252 of FIG. 2. For example, the channel selector 246 (FIG. 2) may generate channel select waveforms of the channel select waveform 506. The first display waveform 508 may implement first display data displayed and/or otherwise presented on the first display channel 144 of FIG. 1C. For example, the first display channel 204 (FIG. 2) may display the first display data of the first display waveform 508 on the first display device 216 (FIG. 2). The second display waveform 510 may implement second display data displayed and/or otherwise presented on the second display channel 146 of FIG. 1C. For example, the second display channel 206 (FIG. 2) may display the second display data of the second display waveform 510 on the second display device 224 (FIG. 2).

At a first example time ($T_1$) 512, the video sync 244 generates a rising edge of a first VSYNC pulse of the video synchronization waveform 502. In response to the rising edge of the first VSYNC pulse at the first time 512, the output data handler 242 outputs a first input video frame, which is represented in FIG. 5 as first display frame one (FDF1), to the display controllers 210, 218, 226 (FIG. 2) including the first display controller 210 (FIG. 2). In some examples, the first display controller 210 may store FDF1 in one(s) of the buffers 212, 214 (FIG. 2) of the first display controller 210.

At a second example time ($T_2$) 514, the video sync 244 generates a rising edge of a second VSYNC pulse of the video synchronization waveform 502. In response to the rising edge of the second VSYNC pulse at the second time 514, the output data handler 242 outputs a second input video frame, which is represented in FIG. 5 as second display frame one (SDF1), to the display controllers 210, 218, 226 including the second display controller 218 (FIG. 2). In some examples, the second display controller 218 may store SDF1 one(s) of the buffers 220, 222 (FIG. 2) of the second display controller 218. In this example, the time difference between the first time 512 and the second time 514 is a time period that corresponds to a 120 Hz frequency. For example, the video sync 244 may receive the VSYNC pulses and the input data handler 240 may receive the input video frames of the input video frame waveform 504 at 120 Hz frequency.

In response to the rising edge of the second VSYNC pulse at the second time 514, the channel selector 246 (FIG. 2) generates a rising edge of a first channel select waveform of the channel select waveform 506. In response to the rising edge of the first channel select waveform, the first display controller 210 instructs the first display device 216 (FIG. 2) to display dark display data, dark video data, etc., (such as a dark or black frame, a dark or black display frame, a dark or black video frame, etc., that includes only or substantially black or other dark colored pixels) at the second time 514. Advantageously, the first display controller 210 may instruct the first display device 216 to insert a black or dark video frame between original video frames of the input video frames waveform 504 to reduce motion blur. Additionally or alternatively, the first display controller 210 my insert any other type of video frame (e.g., a video frame that is darker or has reduced lighting compared to the original video frame) to reduce motion blur.

At a third example time ($T_3$) 516, the video sync 244 receives a rising edge of a third VSYNC pulse of the video synchronization waveform 502. In response to the rising edge of the third VSYNC pulse at the third time 516, the input data handler 240 receives FDF2. At the third time 516, the output data handler 242 may transmit and/or otherwise provide FDF2 to the first display controller 210. In some examples, the first display controller 210 may store FDF2 in one(s) of the buffers 212, 214 of the first display controller 210. At the third time 516, the channel selector 246 generates a falling edge of the first channel select waveform. In response to the falling edge of the first channel select waveform, the first display controller 210 instructs the first display device 216 to display FDF1 and the second display controller 218 instructs the second display device 224 (FIG. 2) to display SDF1 at the third time 516.

At a fourth example time ($T_4$) 518, the video sync 244 receives a rising edge of a fourth VSYNC pulse of the video synchronization waveform 502. In response to the rising edge of the fourth VSYNC pulse at the fourth time 518, the input data handler 240 receives SDF2. At the fourth time 518, the output data handler 242 may transmit and/or otherwise provide SDF2 to the second display controller 218. In some examples, the second display controller 218 may store SDF2 in one(s) of the buffers 220, 222 of the second display controller 218.

In response to the rising edge of the fourth VSYNC pulse at the fourth time 518, the channel selector 246 generates a rising edge of a second channel select waveform of the channel select waveform 306. In response to the rising edge of the second channel select waveform, the first display controller 210 instructs the first display device 216 to display a first dark frame and the second display controller 218 directs the second display device 224 to display a second dark frame at the fourth time 518. In this example, the first display device 216 displays FDF1 from the third time 516 until the fourth time 518. In this example, a frame including the dark frame and FDF1 is displayed at 60 Hz frequency. For example, the multi-channel display controller 102 may control display of the input video frames (such as FDF1, SDF1, FDF2, etc.) at a frequency less than the VSYNC pulses. Alternatively, the multi-channel display controller 102 may control display of the input video frames at any other frequency. Advantageously, the multi-channel display controller 102 may achieve the display of input video frames of the input video frame waveform 504 on multiple display devices using a delayed display technique as illustrated in the third timing diagram 500.

Figure 6:
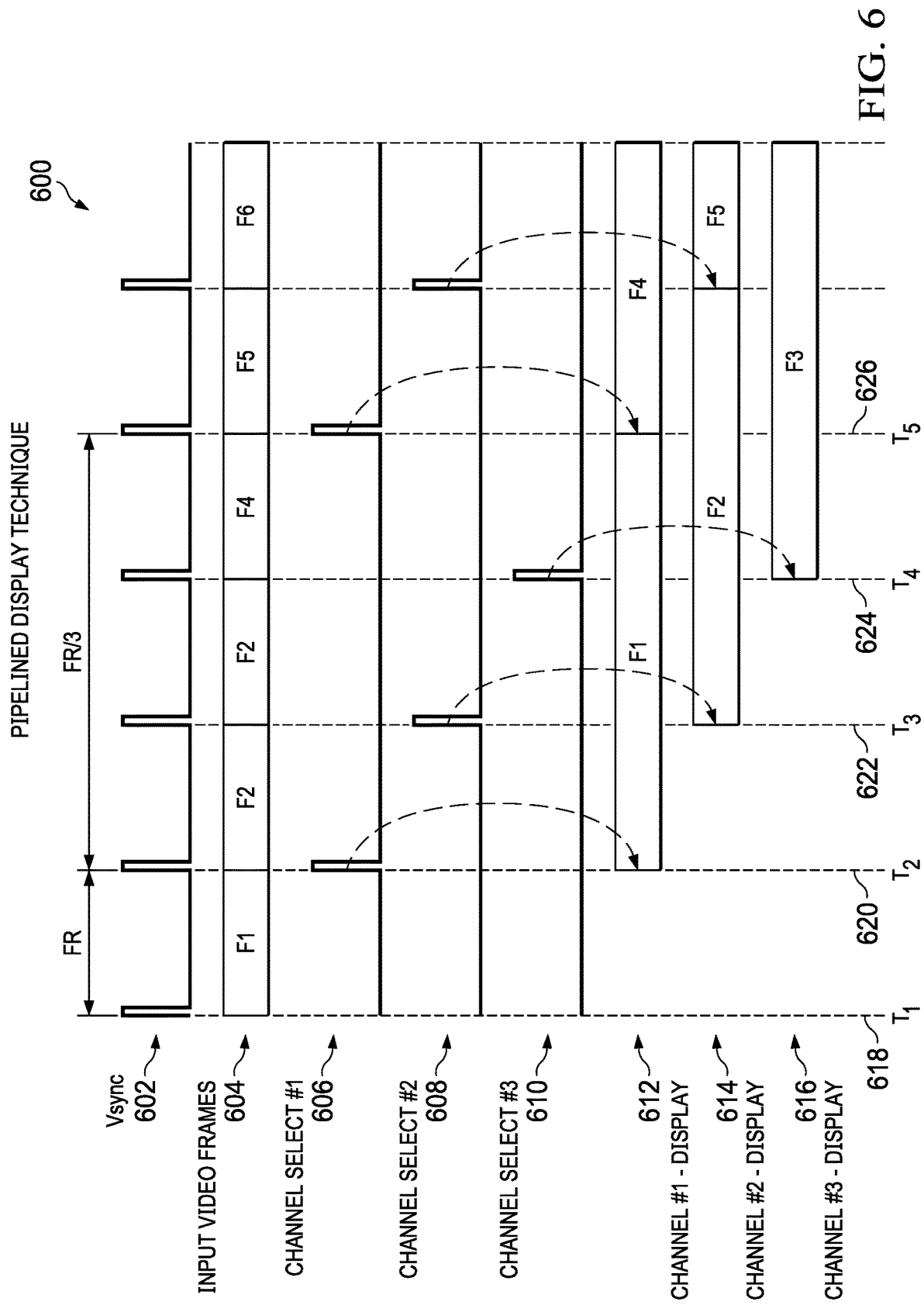
FIG. 6 is a timing diagram corresponding to an example pipelined display technique for a three channel display system.

FIG. 6 is a fourth timing diagram 600 corresponding to an example pipelined display technique for a three channel display system. In this example, the three channel display system may use one, two, or three displays at a given time. The fourth timing diagram 600 includes an example video synchronization waveform (VSYNC) 602, an example input video frames waveform 604, a first example channel select waveform (CHANNEL SELECT #1) 606, a second example channel select waveform (CHANNEL SELECT #2) 608, a third example channel select waveform (CHANNEL SELECT #3) 610, a first example display channel (CHANNEL #1 DISPLAY) 612, a second example display channel (CHANNEL #2 DISPLAY) 614, and a third example display channel (CHANNEL #3 DISPLAY) 616. The fourth timing diagram 600 may implement example operation of a display system having three or more channels, such as the first multi-channel display system 100 of FIG. 1A, the second multi-channel display system 120 of FIG. 1B, and/or the multi-channel display system 200 of FIG. 2.

The video synchronization waveform 602 may implement video synchronization pulses generated by the multi-channel display controller 102 of FIGS. 1A-2, For example, the video sync 244 (FIG. 2) may generate the VSYNC pulses of the video synchronization waveform 602. The input video frames waveform 604 may implement display frames, video frames, etc., included in the second input video 203 of FIG. 2. For example, the output data handler 242 (FIG. 2) may output the display frames, the video frames, etc., of the input video frame waveform 604.

The channel select waveforms 606, 608, 610 may implement the channel select waveforms 252 of FIG. 2. For example, the channel selector 246 (FIG. 2) may generate channel select waveform(s) of one or more of the channel select waveforms 606, 608, 610. The first display channel 612 may implement the first display channel 108 of FIG. 1A, the first display channel 124 of FIG. 1B, the first display channel 204 of FIG. 2, etc. For example, the first display channel 204 may display first display data of the first display channel 612 on the first display device 216 of FIG. 2. The second display channel 614 may implement the second display channel 110 of FIG. 1A, the second display channel 126 of FIG. 1B, the second display channel 206 of FIG. 2, etc. For example, the second display channel 206 may display second display data of the second display channel 614 on the second display device 224 of FIG. 2. The third display channel 208 may implement the third display channel 112 of FIG. 1A, the third display channel 128 of FIG. 1B, the third display channel 208 of FIG. 2, etc. For example, the third display channel 208 may display third display data of the third display channel 616 on the third display device 232 of FIG. 2.

At a first example time ($T_1$) 618, the video sync 244 generates a rising edge of a first VSYNC pulse of the video synchronization waveform 602. In response to the rising edge of the first VSYNC pulse at the first time 618, the output data handler 242 outputs a first input video frame (F1) to the display controllers 210, 218, 226 including the first display controller 210, the second display controller 218, and the third display controller 226. In some examples, one(s) of the first display controller 210, the second display controller 218, and/or the third display controller 226 may store F1 in one(s) of the buffers 212, 214 (FIG. 2) of the first display controller 210, one(s) of the buffers 220, 222 (FIG. 2) of the second display controller 218, and/or one(s) of the buffers 228, 230 (FIG. 2) of the third display controller 226.

At a second example time ($T_2$) 620, the video sync 244 generates a rising edge of a second VSYNC pulse of the video synchronization waveform 602. In response to the rising edge of the second VSYNC pulse at the second time 620, the output data handler 242 outputs a second input video frame (F2) to the display controllers 210, 218, 226 including the first display controller 210, the second display controller 218, and the third display controller 226. In some examples, one(s) of the first display controller 210, the second display controller 218, and/or the third display controller 226 may store F2 in one(s) of the buffers 212, 214 of the first display controller 210, one(s) of the buffers 220, 222 of the second display controller 218, and/or one(s) of the buffers 228, 230 of the third display controller 226. At the second time 620, the channel selector 246 asserts the first channel select waveform 606, which invokes and/or otherwise instructs the first display channel 612 to display F1.

At a third example time ($T_3$) 622, the video sync 244 generates a rising edge of a third VSYNC pulse of the video synchronization waveform 602. In response to the rising edge of the third VSYNC pulse at the third time 622, the output data handler 242 outputs a third input video frame (F3) to the display controllers 210, 218, 226 including the first display controller 210, the second display controller 218, and the third display controller 226. In some examples, one(s) of the first display controller 210, the second display controller 218, and/or the third display controller 226 may store F3 in one(s) of the buffers 212, 214 of the first display controller 210, one(s) of the buffers 220, 222 of the second display controller 218, and/or one(s) of the buffers 228, 230 of the third display controller 226. At the third time 622, the channel selector 246 asserts the second channel select waveform 608, which invokes and/or otherwise directs the second display channel 614 to display F2.

At a fourth example time ($T_4$) 624, the video sync 244 generates a rising edge of a fourth VSYNC pulse of the video synchronization waveform 602. In response to the rising edge of the fourth VSYNC pulse at the fourth time 624, the output data handler 242 delivers a fourth input video frame (F4) to the display controllers 210, 218, 226 including the first display controller 210, the second display controller 218, and the third display controller 226. In some examples, one(s) of the first display controller 210, the second display controller 218, and/or the third display controller 226 may store F4 in one(s) of the buffers 212, 214 of the first display controller 210, one(s) of the buffers 220, 222 of the second display controller 218, and/or one(s) of the buffers 228, 230 of the third display controller 226. At the fourth time 624, the channel selector 246 asserts the third channel select waveform 610, which invokes and/or otherwise causes the third display channel 616 to display F3.

In this example, the first display channel 612 displays F1 from the second time 620 until a fifth example time ($T_5$) 626. The time period spanning the second time 620 and the fifth time 626 constitutes a frequency that is one-third (⅓) of a frequency of the VSYNC pulses of the video synchronization waveform 602. Advantageously, the multi-channel display controller 102 may effectuate the display of input video frames of the input video frame waveform 604 on multiple display devices using a pipelined display technique as illustrated in the fourth timing diagram 600 by utilizing channel select waveforms for respective ones of the display channels.

Figure 7:
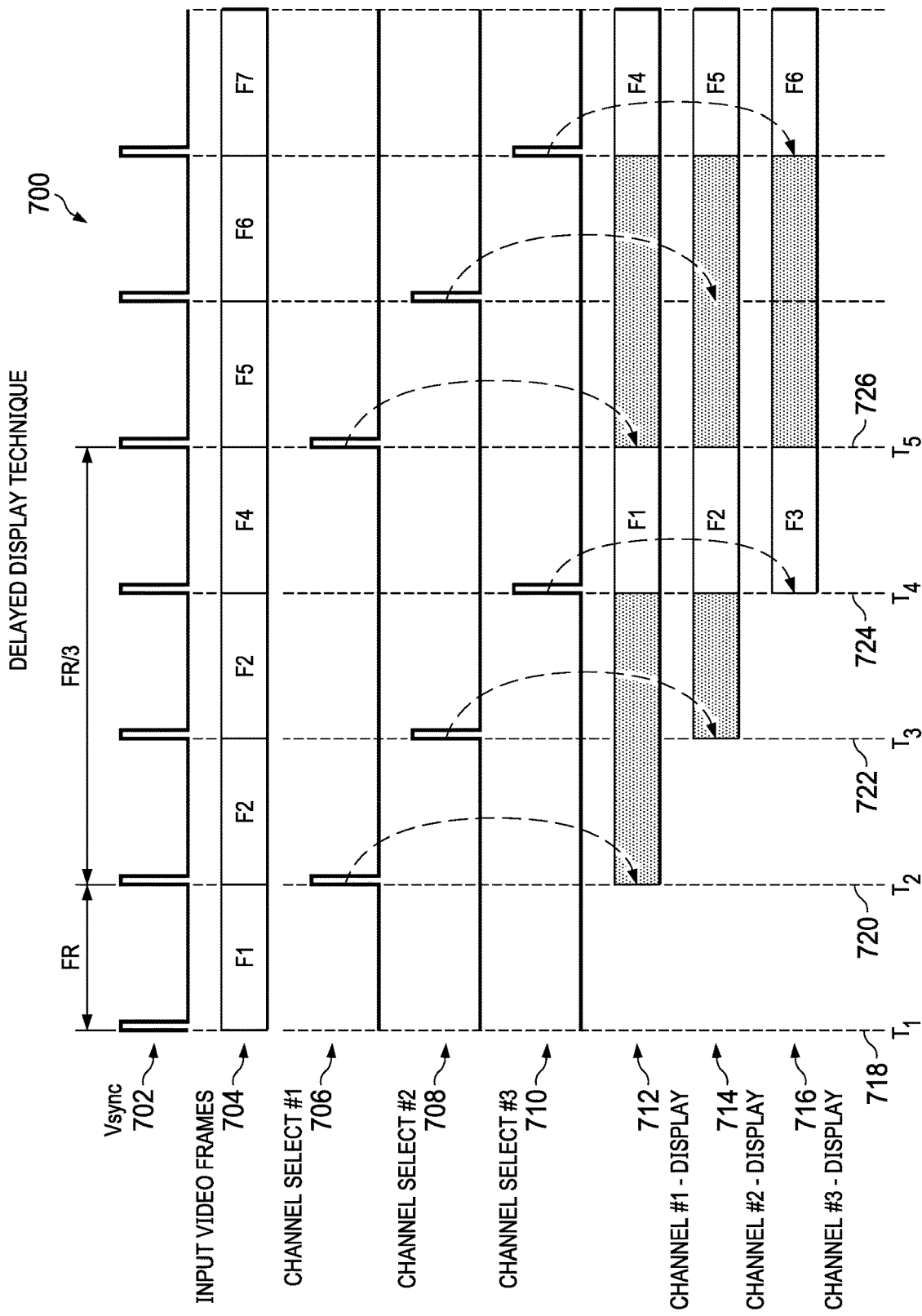
FIG. 7 is a timing diagram corresponding to an example delayed display technique for a three channel display system.

FIG. 7 is a fifth timing diagram 700 corresponding to an example delayed display technique for a three channel display system. In this example, the three channel display system may use one, two, or three displays at a given time. The fifth timing diagram 700 includes an example video synchronization waveform (VSYNC) 702, an example input video frames waveform 704, a first example channel select waveform (CHANNEL SELECT #1) 706, a second example channel select waveform (CHANNEL SELECT #2) 708, a third example channel select waveform (CHANNEL SELECT #3) 710, a first example display channel (CHANNEL #1 DISPLAY) 712, a second example display channel (CHANNEL #2 DISPLAY) 714, and a third example display channel (CHANNEL #3 DISPLAY) 716. The fifth timing diagram 700 may implement example operation of a display system having three or more channels, such as the first multi-channel display system 100 of FIG. 1A, the second multi-channel display system 120 of FIG. 1B, and/or the multi-channel display system 200 of FIG. 2.

The video synchronization waveform 702 may implement video synchronization pulses, signals, etc., generated by the multi-channel display controller 102 of FIGS. 1A-2. For example, the video sync 244 (FIG. 2) may generate the VSYNC pulses of the video synchronization waveform 702. The input video frames waveform 704 may implement display frames, video frames, etc., included in the second input video 203 of FIG. 2. For example, the output data handler 242 (FIG. 2) may output the display frames, the video frames, etc., of the input video frame waveform 704.

The channel select waveforms 706, 708, 710 may implement the channel select waveforms 252 of FIG. 2. For example, the channel selector 246 (FIG. 2) may generate channel select waveform(s) of one or more of the channel select waveforms 706, 708, 710, The first display channel 712 may implement the first display channel 108 of FIG. 1A, the first display channel 124 of FIG. 1B, the first display channel 204 of FIG. 2, etc. For example, the first display channel 204 may display first display data of the first display channel 712 on the first display device 216 of FIG. 2. The second display channel 714 may implement the second display channel 110 of FIG. 1A, the second display channel 126 of FIG. 1B, the second display channel 206 of FIG. 2, etc. For example, the second display channel 206 may display second display data of the second display channel 714 on the second display device 224 of FIG. 2. The third display channel 716 may implement the third display channel 112 of FIG. 1A, the third display channel 128 of FIG. 1B, the third display channel 208 of FIG. 2, etc. For example, the third display channel 716 may display third display data of the third display channel 716 on the third display device 232 of FIG. 2.

At a first example time ($T_1$) 718, the video sync 244 generates a rising edge of a first VSYNC pulse of the video synchronization waveform 702. In response to the rising edge of the first VSYNC pulse at the first time 718, the output data handler 242 provides a first input video frame (F1) to the display controllers 210, 218, 226 including the first display controller 210, the second display controller 218, and the third display controller 226. In some examples, one(s) of the first display controller 210, the second display controller 218, and/or the third display controller 226 may store F1 in one(s) of the buffers 212, 214 (FIG. 2) of the first display controller 210, one(s) of the buffers 220, 222 (FIG.

2) of the second display 218, and/or one(s) of the buffers 228, 230 (FIG. 2) of the third display controller 226.

At a second example time ($T_2$) 720, the video sync 244 generates a rising edge of a second VSYNC pulse of the video synchronization waveform 702. In response to the rising edge of the second VSYNC pulse at the second time 720, the output data handler 242 outputs a second input video frame (F2) to the display controllers 210, 218, 226 including the first display controller 210, the second display controller 218, and the third display controller 226. In some examples, one(s) of the first display controller 210, the second display controller 218, and/or the third display controller 226 may store F2 in one(s) of the buffers 212, 214 of the first display controller 210, one(s) of the buffers 220, 222 of the second display controller 218, and/or one(s) of the buffers 228, 230 of the third display controller 226. At the second time 720, the channel selector 246 asserts the first channel select waveform 706, which invokes and/or otherwise instructs the first display channel 712 to display a dark frame.

At a third example time ($T_3$) 722, the video sync 244 generates a rising edge of a third VSYNC pulse of the video synchronization waveform 702. In response to the rising edge of the third VSYNC pulse at the third time 722, the output data handler 242 delivers a third input video frame (F3) to the display controllers 210, 218, 226 including the first display controller 210, the second display controller 218, and the third display controller 226. In some examples, one(s) of the first display controller 210, the second display controller 218, and/or the third display controller 226 may store F3 in one(s) of the buffers 212, 214 of the first display controller 210, one(s) of the buffers 220, 222 of the second display controller 218, and/or one(s) of the buffers 228, 230 of the third display controller 226. At the third time 722, the channel selector 246 asserts the second channel select waveform 708, which invokes and/or otherwise directs the second display channel 714 to display a dark frame.

At a fourth example time ($T_4$) 724, the video sync 244 generates a rising edge of a fourth VSYNC pulse of the video synchronization waveform 702. In response to the rising edge of the fourth VSYNC pulse at the fourth time 724, the output data handler 242 provides a fourth input video frame (F4) to the display controllers 210, 218, 226 including the first display controller 210, the second display controller 218, and the third display controller 226. In some examples, one(s) of the first display controller 210, the second display controller 218, and/or the third display controller 226 may store F4 in one(s) of the buffers 212, 214 of the first display controller 210, one(s) of the buffers 220, 222 of the second display controller 218, and/or one(s) of the buffers 228, 230 of the third display controller 226. At the fourth time 724, the channel selector 246 asserts the third channel select waveform 610, which invokes and/or otherwise causes the first display channel 712 to display F1, the second display channel 714 to display F2, and the third display channel 716 to display F3.

In this example, the first display channel 712 displays F1, the second display channel 714 displays F2, and the third display channel 716 displays F3 from the fourth time 724 until a fifth example time ($T_5$) 726. The time period spanning the fourth time 724 and the fifth time 726 corresponds to a frequency that is less than one-third (⅓) of a frequency of the VSYNC pulses of the video synchronization waveform 702. Advantageously, the multi-channel display controller 102 may effectuate the display of input video frames of the input video frame waveform 704 on multiple display devices using a delayed display technique as illustrated in the fifth timing diagram 700 by utilizing channel select waveforms for respective ones of the display channels.

Figure 8:
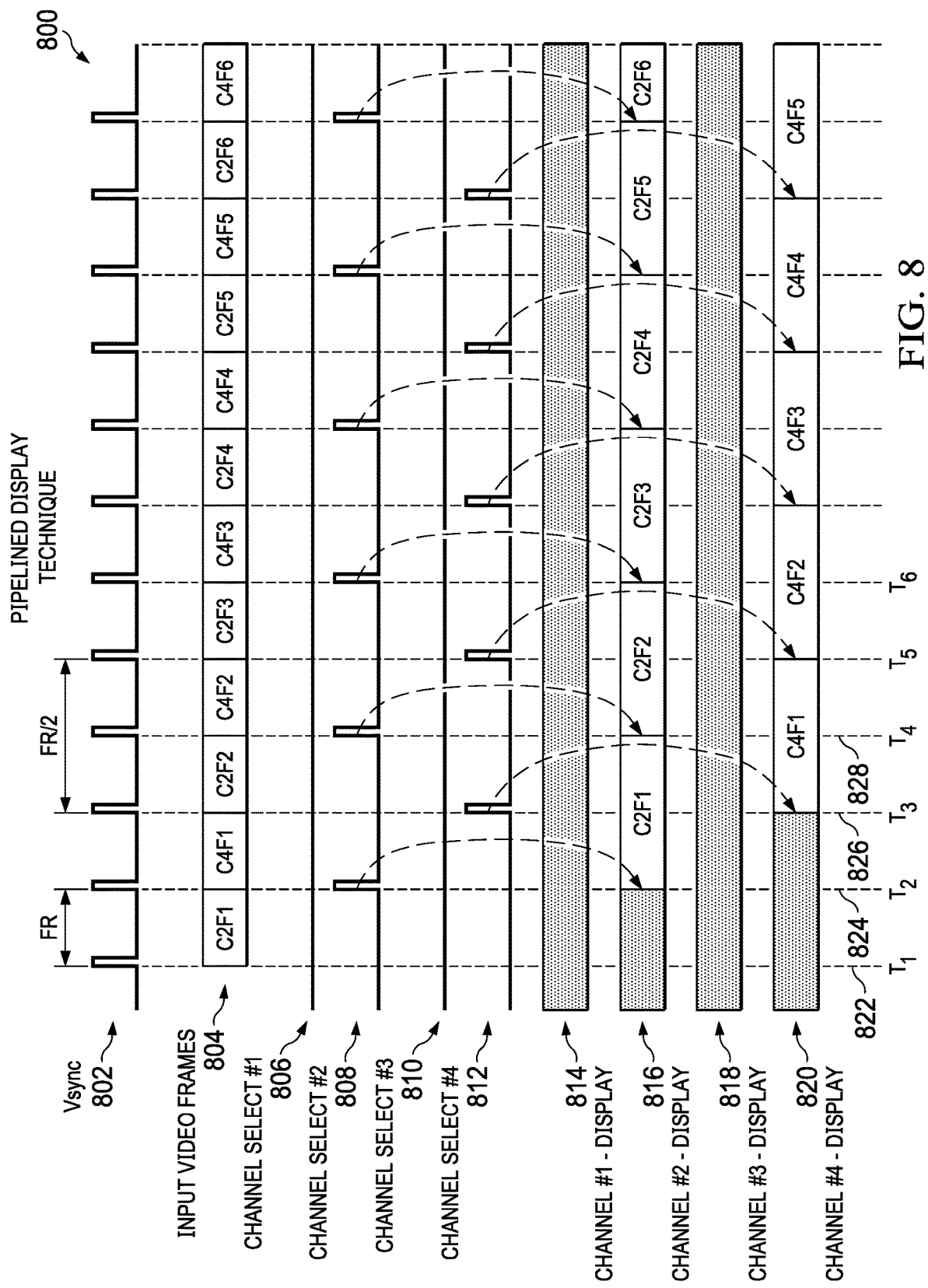
FIG. 8 is a timing diagram corresponding to an example pipelined display technique for a four channel display system.

FIG. 8 is a fifth timing diagram 800 corresponding to an example pipelined display technique for a four channel display system. In this example, the fifth timing diagram 800 implements a multi-channel display system, which has a portion of display channels active at a given time (such as N display channels active out of M total display channels). In this example, two out of four total display channels may be active at a given time.

The fifth timing diagram 800 includes an example video synchronization waveform (VSYNC) 802, an example input video frames waveform 804, a first example channel select waveform (CHANNEL SELECT #1) 806, a second example channel select waveform (CHANNEL SELECT #2) 808, a third example channel select waveform (CHANNEL SELECT #3) 810, a fourth example channel select waveform (CHANNEL SELECT #4) 812, a first example display channel (CHANNEL #1 DISPLAY) 814, a second example display channel (CHANNEL #2 DISPLAY) 816, a third example display channel (CHANNEL #3 DISPLAY) 818, and a fourth example display channel (CHANNEL #4 DISPLAY) 820. The fifth timing diagram 800 may implement example operation of a display system having four or more channels, such as the first multi-channel display system 100 of FIG. 1A, the second multi-channel display system 120 of FIG. 1B, and/or the multi-channel display system 200 of FIG. 2.

The video synchronization waveform 802 may implement video synchronization pulses, signals, etc., provided by the multi-channel display controller 102 of FIGS. 1A-2. For example, the video sync 244 (FIG. 2) may generate and/or otherwise output the VSYNC pulses of the video synchronization waveform 802. The input video frames waveform 804 may implement display frames, video frames, etc., included in the second input video 203 of FIG. 2. For example, the output data handler 242 (FIG. 2) may output the display frames, the video frames, etc., of the input video frame waveform 804. The channel select waveforms 806, 808, 810, 812 may implement the channel select waveforms 252 of FIG. 2. For example, the channel selector 246 (FIG. 2) may generate channel select waveform(s) of one or more of the channel select waveforms 806, 808, 810, 812.

The first display channel 814 may implement the first display channel 108 of FIG. 1A, the first display channel 124 of FIG. 1B, the first display channel 204 of FIG. 2, etc. For example, the first display channel 204 may display first display data of the first display channel 814 on the first display device 216 of FIG. 2. The second display channel 816 may implement the second display channel 110 of FIG. 1A, the second display channel 126 of FIG. 1B, the second display channel 206 of FIG. 2, etc. For example, the second display channel 206 may display second display data of the second display channel 816 on the second display device 224 of FIG. 2. The third display channel 818 may implement the third display channel 112 of FIG. 1A, the third display channel 128 of FIG. 1B, the third display channel 208 of FIG. 2, etc. For example, the third display channel 208 may display third display data of the third display channel 818 on the third display device 232 of FIG. 2. The fourth display channel 820 may implement the fourth display channel 114 of FIG. 1A, the fourth display channel 130 of FIG. 1B, a fourth display channel of FIG. 2, etc. For example, the fourth display channel of the multi-channel display device 202 may display fourth display data of the fourth display channel 820 on a fourth display device of the multi-channel display device 202 of FIG. 2.

At a first example time (T$_1$) 822, the video sync 244 generates a rising edge of a first VSYNC pulse of the video synchronization waveform 802. In response to the rising edge of the first VSYNC pulse at the first time 822, the output data handler 242 outputs a first input video frame (C2F1) to at least the first display controller 210, the second display controller 218, and the third display controller 226. In some examples, at least one(s) of the first display controller 210, the second display controller 218, and/or the third display controller 226 may store C2F1 one(s) of the buffers 212, 214 (FIG. 2) of the first display controller 210, one(s) of the buffers 220, 222 (FIG. 2) of the second display controller 218, and/or one(s) of the buffers 228, 230 (FIG. 2) of the third display controller 226.

At a second example time (T$_2$) 824, the video sync 244 generates a rising edge of a second VSYNC pulse of the video synchronization waveform 802. In response to the rising edge of the second VSYNC pulse at the second time 824, the output data handler 242 provides a second input video frame (C4F1) to at least the first display controller 210, the second display controller 218, and the third display controller 226. In some examples, at least one(s) of the first display controller 210, the second display controller 218, and/or the third display controller 226 may store C4F1 in one(s) of the buffers 212, 214 of the first display controller 210, one(s) of the buffers 220, 222 of the second display controller 218, and/or one(s) of the buffers 228, 230 of the third display controller 226. At the second time 824, the channel selector 246 asserts the second channel select waveform 808, which invokes and/or otherwise instructs the second display channel 816 to display C2F1.

At a third example time (T$_3$) 826, the video sync 244 generates a rising edge of a third VSYNC pulse of the video synchronization waveform 802. In response to the rising edge of the third VSYNC pulse at the third time 826, the output data handler 242 outputs a third input video frame (C2F2) to at least the first display controller 210, the second display controller 218, and the third display controller 226. In some examples, at least one(s) of the first display controller 210, the second display controller 218, and/or the third display controller 226 may store C2F2 one(s) of the buffers 212, 214 of the first display controller 210, one(s) of the buffers 220, 222 of the second display controller 218, and/or one(s) of the buffers 228, 230 of the third display controller 226. At the third time 826, the channel selector 246 asserts the fourth channel select waveform 812, which invokes and/or otherwise directs the fourth display channel 820 to display C4F1.

At a fourth example time (T$_4$) 828, the video sync 244 generates a rising edge of a fourth VSYNC pulse of the video synchronization waveform 802. In response to the rising edge of the fourth VSYNC pulse at the fourth time 828, the output data handler 242 provides a fourth input video frame (C4F2) to at least the first display controller 210, the second display controller 218, and the third display controller 226. In some examples, at least one(s) of the first display controller 210, the second display controller 218, and/or the third display controller 226 may store C4F2 in one(s) of the buffers 212, 214 of the first display controller 210, one(s) of the buffers 220, 222 of the second display controller 218, and/or one(s) of the buffers 228, 230 of the third display controller 226. At the fourth time 828, the channel selector 246 asserts the second channel select waveform 808, which invokes and/or otherwise causes the second display channel 816 to display C2F2.

In this example, the second display channel 816 displays C2F1 from the second time 824 until the fourth time 828.

The time period spanning the second time 824 and the fourth time 828 is representative of a frequency that is one-half (½) of a frequency of the VSYNC pulses of the video synchronization waveform 802. Advantageously, the multi-channel display controller 102 may achieve the display of input video frames of the input video frame waveform 804 on multiple display devices using a pipelined display technique as illustrated in the fifth timing diagram 800 by utilizing channel select waveforms for respective ones of the display channels.

Figure 9:
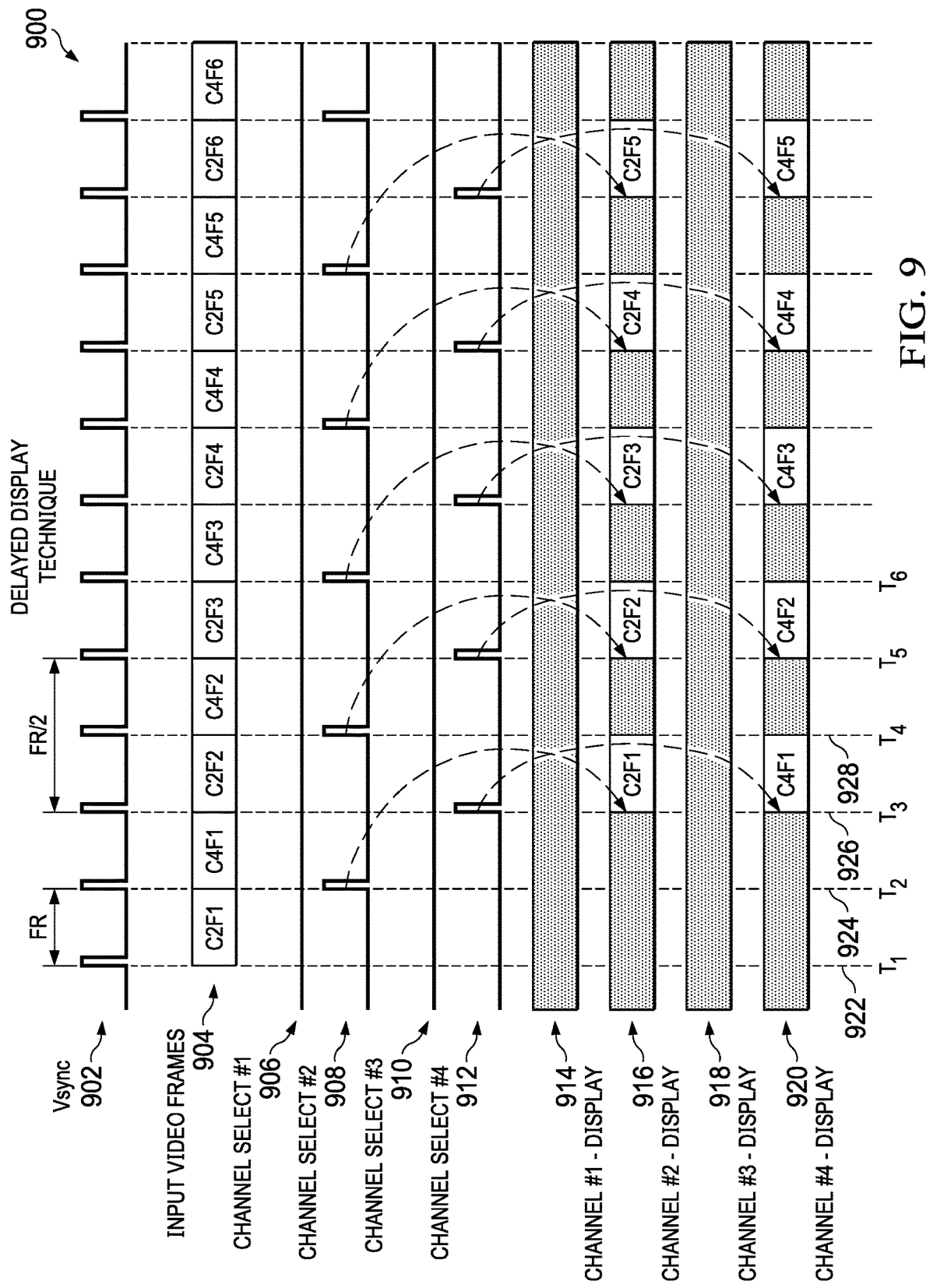
FIG. 9 is a timing diagram corresponding to an example delayed display technique for a four channel display system.

FIG. 9 is a sixth timing diagram 900 corresponding to an example delayed display technique for a four channel display system. In this example, the sixth timing diagram 900 implements a multi-channel display system, which has a portion of display channels active at a given time (such as N display channels active out of M total display channels). In this example, two out of four total display channels may be active at a given time.

The sixth timing diagram 900 includes an example video synchronization waveform (VSYNC) 902, an example input video frames waveform 904, a first example channel select waveform (CHANNEL SELECT #1) 906, a second example channel select waveform (CHANNEL SELECT #2) 908, a third example channel select waveform (CHANNEL SELECT #3) 910, a fourth example channel select waveform (CHANNEL SELECT #4) 912, a first example display channel (CHANNEL #1 DISPLAY) 914, a second example display channel (CHANNEL #2 DISPLAY) 916, a third example display channel (CHANNEL #3 DISPLAY) 918, and a fourth example display channel (CHANNEL #4 DISPLAY) 920. The sixth timing diagram 900 may implement example operation of a display system having four or more channels, such as the first multi-channel display system 100 of FIG. 1A, the second multi-channel display system 120 of FIG. 1B, and/or the multi-channel display system 200 of FIG. 2.

The video synchronization waveform 902 may implement video synchronization pulses, signals, etc., generated by the multi-channel display controller 102 of FIGS. 1A-2. For example, the video sync 244 (FIG. 2) may generate the VSYNC pulses of the video synchronization waveform 902. The input video frames waveform 904 may implement display frames, video frames, etc., included in the second input video 203 of FIG. 2. For example, the output data handler 242 (FIG. 2) may output the display frames, the video frames, etc., of the input video frame waveform 904. The channel select waveforms 906, 908, 910, 912 may implement the channel select waveforms 252 of FIG. 2. For example, the channel selector 246 (FIG. 2) may generate channel select waveform(s) of one or more of the channel select waveforms 906, 908, 910, 912.

The first display channel 914 may implement the first display channel 108 of FIG. 1A, the first display channel 124 of FIG. 1B, the first display channel 204 of FIG. 2, etc. For example, the first display channel 204 may display first display data of the first display channel 914 on the first display device 216 of FIG. 2. The second display channel 916 may implement the second display channel 110 of FIG. 1A, the second display channel 126 of FIG. 1B, the second display channel 206 of FIG. 2, etc. For example, the second display channel 206 may display second display data of the second display channel 916 on the second display device 224 of FIG. 2. The third display channel 918 may implement the third display channel 112 of FIG. 1A, the third display channel 128 of FIG. 1B, the third display channel 208 of FIG. 2, etc. For example, the third display channel 208 may display third display data of the third display channel 918 on the third display device 232 of FIG. 2. The fourth display channel 920 may implement the fourth display channel 114 of FIG. 1A, the fourth display channel 130 of FIG. 1B, a fourth display channel of FIG. 2, etc. For example, the fourth display channel 920 may display fourth display data of the fourth display channel on a fourth display device of the multi-channel display device 202 of FIG. 2.

At a first example time ($T_1$) 922, the video sync 244 outputs a rising edge of a first VSYNC pulse of the video synchronization waveform 902. In response to the rising edge of the first VSYNC pulse at the first time 922, the output data handler 242 outputs a first input video frame (C2F1) to at least the first display controller 210, the second display controller 218, and the third display controller 226. In some examples, at least one(s) of the first display controller 210, the second display controller 218, and/or the third display controller 226 may store C2F1 in one(s) of the buffers 212, 214 (FIG. 2) of the first display controller 210, one(s) of the buffers 220, 222 (FIG. 2) of the second display controller 218, and/or one(s) of the buffers 228, 230 (FIG. 2) of the third display controller 226.

At a second example time ($T_2$) 924, the video sync 244 generates a rising edge of a second VSYNC pulse of the video synchronization waveform 902. In response to the rising edge of the second VSYNC pulse at the second time 924, the output data handler 242 outputs a second input video frame (C4F1) to at least the first display controller 210, the second display controller 218, and the third display controller 226. In some examples, at least one(s) of the first display controller 210, the second display controller 218, and/or the third display controller 226 may store C4F1 in one(s) of the buffers 212, 214 of the first display controller 210, one(s) of the buffers 220, 222 of the second display controller 218, and/or one(s) of the buffers 228, 230 of the third display controller 226. At the second time 924, the channel selector 246 asserts the second channel select waveform 908, which invokes and/or otherwise instructs the second display channel 916 to display a dark frame.

At a third example time ($T_3$) 926, the video sync 244 generates a rising edge of a third VSYNC pulse of the video synchronization waveform 902. In response to the rising edge of the third VSYNC pulse at the third time 926, the output data handler 242 outputs a third input video frame (C2F2) to at least the first display controller 210, the second display controller 218, and the third display controller 226. In some examples, at least one(s) of the first display controller 210, the second display controller 218, and/or the third display controller 226 may store C2F2 in one(s) of the buffers 212, 214 of the first display controller 210, one(s) of the buffers 220, 222 of the second display controller 218, and/or one(s) of the buffers 228, 230 of the third display controller 226. At the third time 926, the channel selector 246 asserts the fourth channel select waveform 912, which invokes and/or otherwise directs the second display channel 916 to display C2F1 and the fourth display channel 920 to display C4F1.

At a fourth example time ($T_4$) 928, the video sync 244 generates a rising edge of a fourth VSYNC pulse of the video synchronization waveform 902. In response to the rising edge of the fourth VSYNC pulse at the fourth time 928, the output data handler 242 outputs a fourth input video frame (C4F2) to at least the first display controller 210, the second display controller 218, and the third display controller 226. In some examples, at least one(s) of the first display controller 210, the second display controller 218, and/or the third display controller 226 may store C4F2 in one(s) of the buffers 212, 214 of the first display controller 210, one(s) of the buffers 220, 222 of the second display controller 218, and/or one(s) of the buffers 228, 230 of the third display controller 226. At the fourth time 928, the channel selector 246 asserts the second channel select waveform 908, which invokes and/or otherwise causes the second display channel 916 to display a dark frame and the fourth display channel 920 to display a dark frame.

In this example, the second display channel 916 displays C2F1 from the third time 926 until the fourth time 928. The time period spanning the third time 926 and the fourth time 928 is representative of a frequency that is less than one-half (½) of a frequency of the VSYNC pulses of the video synchronization waveform 902. Advantageously, the multi-channel display controller 102 may effectuate the display of input video frames of the input video frame waveform 904 on multiple display devices using a delayed display technique as illustrated in the sixth timing diagram 900 by utilizing channel select waveforms for respective ones of the display channels.

Figure 10:
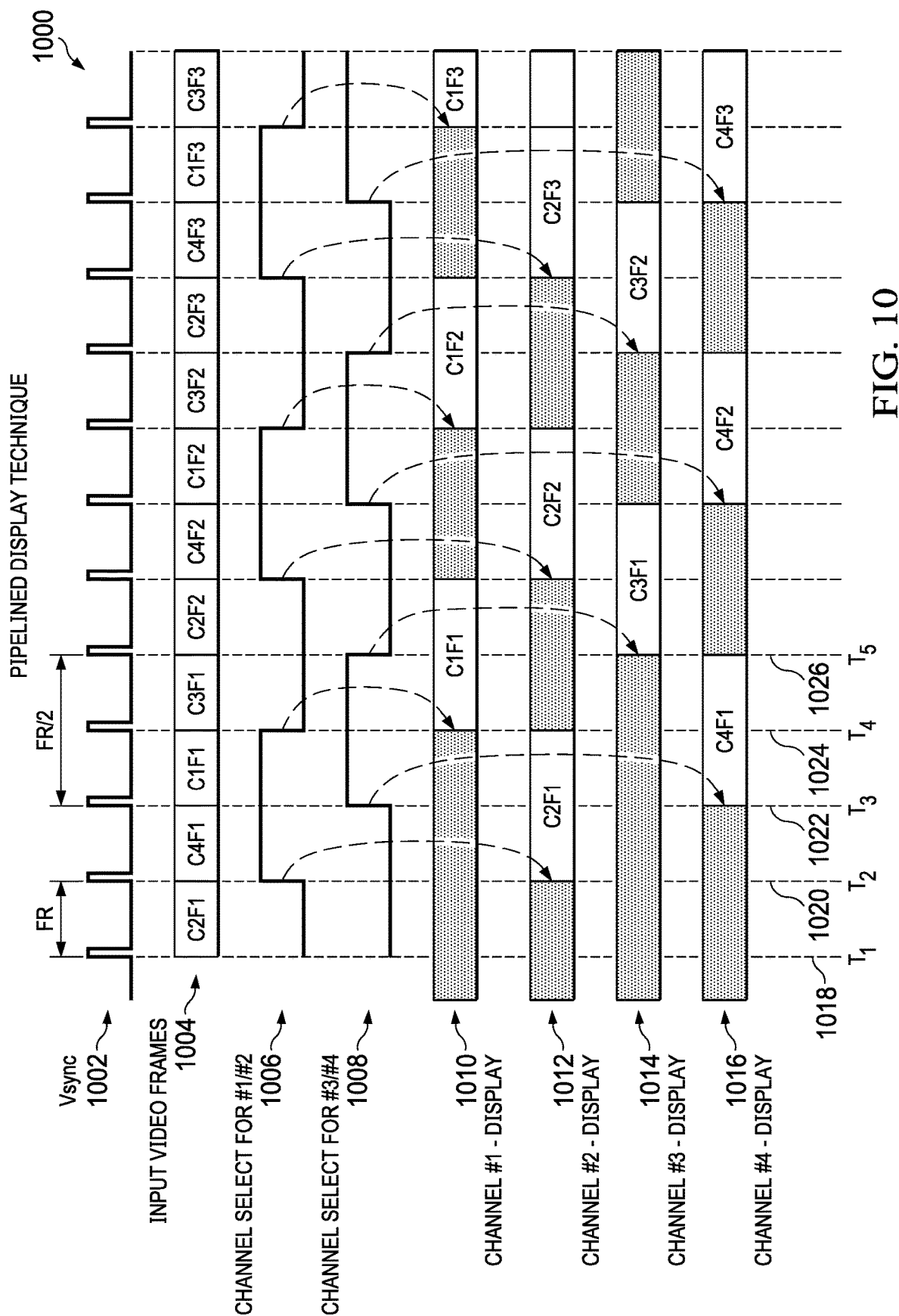
FIG. 10 is another timing diagram corresponding to an example pipelined display technique for a four channel display system.

FIG. 10 is a seventh timing diagram 1000 corresponding to an example pipelined display technique for a four channel display system. In this example, the seventh timing diagram 1000 implements a multi-channel display system, which has a portion of display channels active at a given time (such as N display channels active out of M total display channels).

The seventh timing diagram 1000 includes an example video synchronization waveform (VSYNC) 1002, an example input video frames waveform 1004, a first example channel select waveform (CHANNEL SELECT FOR #1/#2) 1006, a second example channel select waveform (CHANNEL SELECT FOR #3/#4) 1008, a first example display channel (CHANNEL #1 DISPLAY) 1010, a second example display channel (CHANNEL #2 DISPLAY) 1012, a third example display channel (CHANNEL #3 DISPLAY) 1014, and a fourth example display channel (CHANNEL #4 DISPLAY) 1016. The seventh timing diagram 1000 may implement example operation of a display system having four or more channels, such as the first multi-channel display system 100 of FIG. 1A, the second multi-channel display system 120 of FIG. 1B, and/or the multi-channel display system 200 of FIG. 2. In some examples, the one(s) of the display channels 1010, 1012, 1014, 1016 include(s) a plurality of dark regions to represent insertion(s) of dark or black video frame(s) to implement black frame insertion (BFI). Advantageously, the multi-channel display controller 102 of FIGS. 1A-2 may instruct and/or otherwise cause the one(s) of the display channels 1010, 1012, 1014, 1016 to insert the dark or black video frames to reduce motion blur. For example, the insertion of the dark or black video frames may improve the smoothness of motion of objects between original video frames of the input video frames waveform 1004.

The video synchronization waveform 1002 may implement video synchronization pulses, signals, etc., generated by the multi-channel display controller 102. For example, the video sync 244 (FIG. 2) may output the VSYNC pulses of the video synchronization waveform 1002. The input video frames waveform 1004 may implement display frames, video frames, etc., included in the second input video 203 of FIG. 2. For example, the output data handler 242 (FIG. 2) may output the display frames, the video frames, etc., of the input video frame waveform 1004.

The channel select waveforms 1006, 1008 may implement the channel select waveforms 252 of FIG. 2. For example, the channel selector 246 (FIG. 2) may generate channel select waveform(s) of one or more of the channel select waveforms 1006, 1008. In such examples, the channel selector 246 may select at least one of the first display channel 1010 or the second display channel 1012 based on the first channel select waveform 1006. In some such examples, the channel selector 246 may select at least one of the third display channel 1014 or the fourth display channel 1016 based on the second channel select waveform 1008.

The first display channel 1010 may implement the first display channel 108 of FIG. 1A, the first display channel 124 of FIG. 1B, the first display channel 204 of FIG. 2, etc. For example, the first display channel 204 may display first display data of the first display channel 1010 on the first display device 216 of FIG. 2. The second display channel 1012 may implement the second display channel 110 of FIG. 1A, the second display channel 126 of FIG. 1B, the second display channel 206 of FIG. 2, etc. For example, the second display channel 206 may display second display data of the second display channel 1012 on the second display device 224 of FIG. 2. The third display channel 1014 may implement the third display channel 112 of FIG. 1A, the third display channel 128 of FIG. 1B, the third display channel 208 of FIG. 2, etc. For example, the third display channel 208 may display third display data of the third display channel 1014 on the third display device 232 of FIG. 2. The fourth display channel 1016 may implement the fourth display channel 114 of FIG. 1A, the fourth display channel 130 of FIG. 1B, a fourth display channel of FIG. 2, etc. For example, the fourth display channel of the multi-channel display device 202 may display fourth display data of the fourth display channel 1016 on a fourth display device of the multi-channel display device 202 of FIG. 2.

At a first example time ($T_1$) 1018, the video sync 244 generates a rising edge of a first VSYNC pulse of the video synchronization waveform 1002. In response to the rising edge of the first VSYNC pulse at the first time 1018, the output data handler 242 outputs a first input video frame (C2F1) to at least the first display controller 210, the second display controller 218, and the third display controller 226. In some examples, at least one(s) of the first display controller 210, the second display controller 218, and/or the third display controller 226 may store C2F1 in one(s) of the buffers 212, 214 (FIG. 2) of the first display controller 210, one(s) of the buffers 220, 222 (FIG. 2) of the second display controller 218, and/or one(s) of the buffers 228, 230 (FIG. 2) of the third display controller 226.

At a second example time ($T_2$) 1020, the video sync 244 generates a rising edge of a second VSYNC pulse of the video synchronization waveform 1002. In response to the rising edge of the second VSYNC pulse at the second time 1020, the output data handler 242 outputs a second input video frame (C4F1) to at least the first display controller 210, the second display controller 218, and the third display controller 226. In some examples, at least one(s) of the first display controller 210, the second display controller 218, and/or the third display controller 226 may store C4F1 in one(s) of the buffers 212, 214 of the first display controller 210, one(s) of the buffers 220, 222 of the second display controller 218, and/or ones) of the buffers 228, 230 of the third display controller 226. At the second time 1020, the channel selector 246 asserts the first channel select waveform 1006, which invokes and/or otherwise instructs the second display channel 1012 to display C2F1.

At a third example time ($T_3$) 1022, the video sync 244 generates a rising edge of a third VSYNC pulse of the video synchronization waveform 1002. In response to the rising edge of the third VSYNC pulse at the third time 1022, the output data handler 242 outputs a third input video frame (C1F1) to at least the first display controller 210, the second display controller 218, and the third display controller 226. In some examples, at least one(s) of the first display controller 210, the second display controller 218, and/or the third display controller 226 may store C1F1 in one(s) of the buffers 212, 214 of the first display controller 210, one(s) of the buffers 220, 222 of the second display controller 218, and/or one(s) of the buffers 228, 230 of the third display controller 226. At the third time 1022, the channel selector 246 asserts the second channel select waveform 1008, which invokes and/or otherwise directs the fourth display channel 1016 to display C4F1.

At a fourth example time ($T_4$) 1024, the video sync 244 generates a rising edge of a fourth VSYNC pulse of the video synchronization waveform 1002. In response to the rising edge of the fourth VSYNC pulse at the fourth time 1024, the output data handler 242 outputs a fourth input video frame (C3F1) to at least the first display controller 210, the second display controller 218, and the third display controller 226. In some examples, at least one(s) of the first display controller 210, the second display controller 218, and/or the third display controller 226 may store C3F1 in one(s) of the buffers 212, 214 of the first display controller 210, one(s) of the buffers 220, 222 of the second display controller 218, and/or one(s) of the buffers 228, 230 of the third display controller 226. At the fourth time 1024, the channel selector 246 deasserts the first channel select waveform 1006, which invokes and/or otherwise causes the first display channel 1010 to display C1F1.

At a fifth example time ($T_5$) 1026, the video sync 244 generates a rising edge of a fifth VSYNC pulse of the video synchronization waveform 1002. In response to the rising edge of the fifth VSYNC pulse at the fifth time 1026, the output data handler 242 outputs a fifth input video frame (C2F2) to at least the first display controller 210, the second display controller 218, and the third display controller 226. In some examples, at least one(s) of the first display controller 210, the second display controller 218, and/or the third display controller 226 may store C2F2 in one(s) of the buffers 212, 214 of the first display controller 210, one(s) of the buffers 220, 222 of the second display controller 218, and/or one(s) of the buffers 228, 230 of the third display controller 226. At the fifth time 1026, the channel selector 246 deasserts the second channel select waveform 1008, which invokes and/or otherwise causes the third display channel 1014 to display C3F1.

In this example, the second display channel 1012 displays C2F1 from the second time 1020 until the fourth time 1024. The time period spanning the second time 1020 and the fourth time 1024 corresponds to a frequency that is one-half (½) of a frequency of the VSYNC pulses of the video synchronization waveform 1002. Advantageously, the multi-channel display controller 102 may achieve the display of input video frames of the input video frame waveform 1004 on multiple display devices using a pipelined display technique as illustrated in the seventh timing diagram 1000 by utilizing channel select waveforms for respective sets of the display channels.

Figure 11:
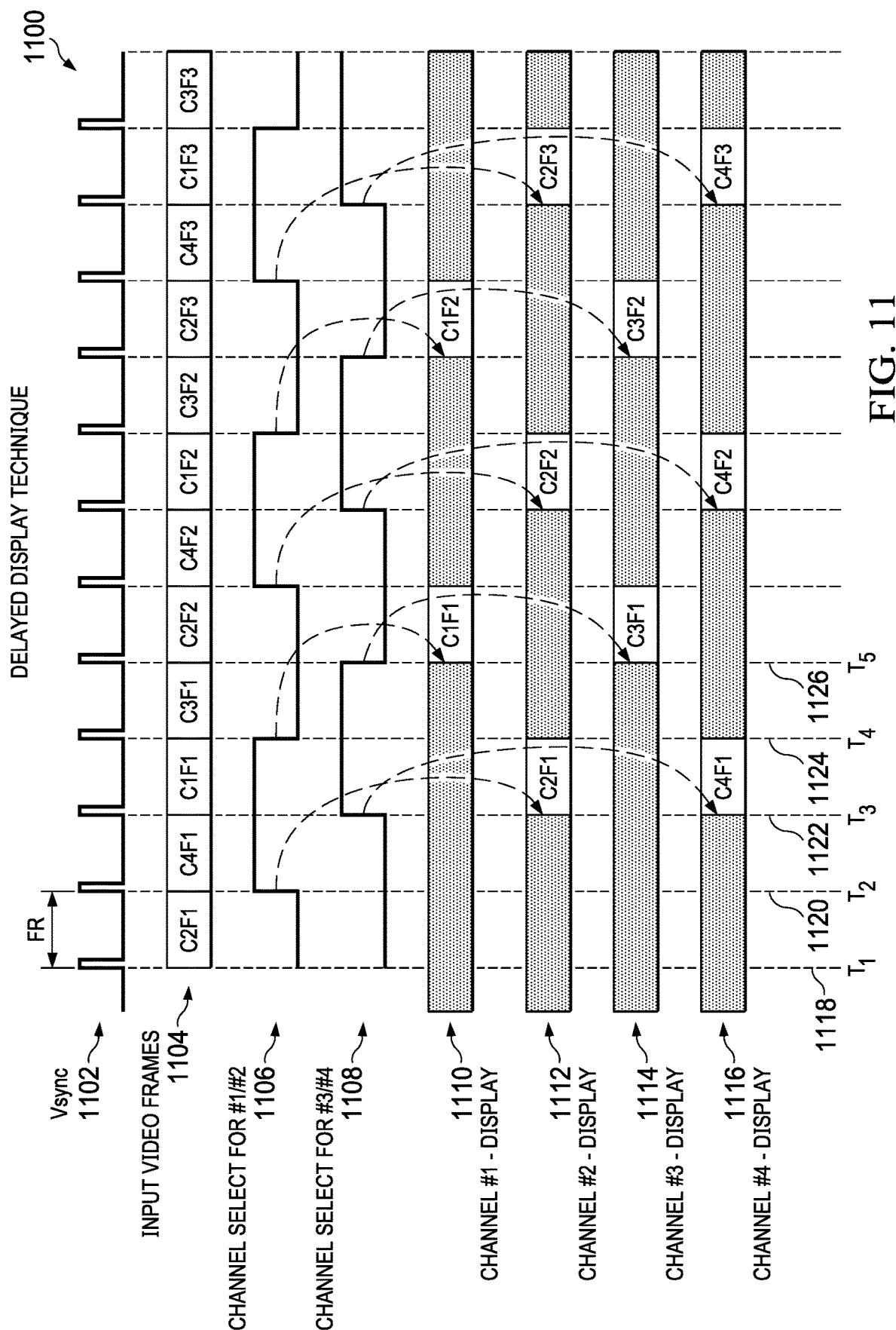
FIG. 11 is another timing diagram corresponding to an example delayed display technique for a four channel display system.

FIG. 11 is an eighth timing diagram 1100 corresponding to an example delayed display technique for a four channel display system. In this example, the eighth timing diagram 1100 implements a multi-channel display system, which has a portion of display channels active at a given time (such as N display channels active out of M total display channels). Advantageously, the multi-channel display controller 102 of FIGS. 1A-2 may instruct and/or otherwise cause the one(s) of the display channels 1110, 1112, 1114, 1116 to insert the dark or black video frames to reduce motion blur. For example, the insertion of the dark or black video frames may improve the smoothness of motion of objects between original video frames of the input video frames waveform 1104.

The eighth timing diagram 1100 includes an example video synchronization waveform (VSYNC) 1102, an example input video frames waveform 1104, a first example channel select waveform (CHANNEL SELECT FOR #1/#2) 1106, a second example channel select waveform (CHANNEL SELECT FOR #3/#4) 1108, a first example display channel (CHANNEL #1 DISPLAY) 1110, a second example display channel (CHANNEL #2 DISPLAY) 1112, a third example display channel (CHANNEL #3 DISPLAY) 1114, and a fourth example display channel (CHANNEL #4 DISPLAY) 1116. The eighth timing diagram 1100 may implement example operation of a display system having four or more channels, such as the first multi-channel display system 100 of FIG. 1A, the second multi-channel display system 120 of FIG. 1B, and/or the multi-channel display system 200 of FIG. 2.

The video synchronization waveform 1102 may implement video synchronization pulses, signals, etc., generated by the multi-channel display controller 102 of FIGS. 1A-2. For example, the video sync 244 (FIG. 2) may output the VSYNC pulses of the video synchronization waveform 1102. The input video frames waveform 1104 may implement display frames, video frames, etc., included in the second input video 203 of FIG. 2. For example, the output data handler 242 (FIG. 2) may output the display frames, the video frames, etc., of the input video frame waveform 1104.

The channel select waveforms 1106, 1108 may implement the channel select waveforms 252 of FIG. 2. For example, the channel selector 246 (FIG. 2) may generate channel select waveform(s) of one or more of the channel select waveforms 1106, 1108. In such examples, the channel selector 246 may select at least one of the first display channel 1110 or the second display channel 1112 based on the first channel select waveform 1106. In some such examples, the channel selector 246 may select at least one of the third display channel 1114 or the fourth display channel 1116 based on the second channel select waveform 1108.

The first display channel 1110 may implement the first display channel 108 of FIG. 1A, the first display channel 124 of FIG. 1B, the first display channel 204 of FIG. 2, etc. For example, the first display channel 204 may display first display data of the first display channel 1110 on the first display device 216 of FIG. 2. The second display channel 1112 may implement the second display channel 110 of FIG. 1A, the second display channel 126 of FIG. 1B, the second display channel 206 of FIG. 2, etc. For example, the second display channel 206 may display second display data of the second display channel 1112 on the second display device 224 of FIG. 2. The third display channel 1114 may implement the third display channel 112 of FIG. 1A, the third display channel 128 of FIG. 1B, the third display channel 208 of FIG. 2, etc. For example, the third display channel 208 may display third display data of the third display channel 1114 on the third display device 232 of FIG. 2. The fourth display channel 1116 may implement the fourth display channel 114 of FIG. 1A, the fourth display channel 130 of FIG. 1B, a fourth display channel of FIG. 2, etc. For example, the fourth display channel of the multi-channel display device 202 may display fourth display data of the fourth display channel 1116 on a fourth display device of the multi-channel display device 202 of FIG. 2.

At a first example time ($T_1$) 1118, the video sync 244 generates a rising edge of a first VSYNC pulse of the video synchronization waveform 1002. In response to the rising edge of the first VSYNC pulse at the first time 1118, the output data handler 242 delivers a first input video frame (C2F1) to at least the first display controller 210, the second display controller 218, and the third display controller 226. In some examples, at least one(s) of the first display controller 210, the second display controller 218, and/or the third display controller 226 may store C2F1 in one(s) of the buffers 212, 214 (FIG. 2) of the first display controller 210, one(s) of the buffers 220, 222 (FIG. 2) of the second display controller 218, and/or one(s) of the buffers 228, 230 (FIG. 2) of the third display controller 226.

At a second example time ($T_2$) 1120, the video sync 244 generates a rising edge of a second VSYNC pulse of the video synchronization waveform 1102. In response to the rising edge of the second VSYNC pulse at the second time 1120, the output data handler 242 outputs a second input video frame (C4F1) to at least the first display controller 210, the second display controller 218, and the third display controller 226. In some examples, at least one(s) of the first display controller 210, the second display controller 218, and/or the third display controller 226 may store C4F1 in one(s) of the buffers 212, 214 of the first display controller 210, one(s) of the buffers 220, 222 of the second display controller 218, and/or one(s) of the buffers 228, 230 of the third display controller 226. At the second time 1120, the channel selector 246 asserts the first channel select waveform 1106, which invokes and/or otherwise instructs the first display channel 1110 and the second display channel 1112 to display dark frames.

At a third example time ($T_3$) 1122, the video sync 244 generates a rising edge of a third VSYNC pulse of the video synchronization waveform 1102. In response to the rising edge of the third VSYNC pulse at the third time 1122, the output data handler 242 outputs a third input video frame (C2F2) to at least the first display controller 210, the second display controller 218, and the third display controller 226. In some examples, at least one(s) of the first display controller 210, the second display controller 218, and/or the third display controller 226 may store C2F2 in one(s) of the buffers 212, 214 of the first display controller 210, one(s) of the buffers 220, 222 of the second display controller 218, and/or one(s) of the buffers 228, 230 of the third display controller 226.

At the third time 1122, the second display channel 1112 presents C2F1 in response to the assertion of the first channel select waveform 1106. At the third time 1122, the channel selector 246 asserts the second channel select waveform 1108, which invokes and/or otherwise directs the fourth display channel 1116 to display C4F1.

At a fourth example time ($T_4$) 1124, the video sync 244 generates a rising edge of a fourth VSYNC pulse of the video synchronization waveform 1102. In response to the rising edge of the fourth VSYNC pulse at the fourth time 1124, the output data handler 242 outputs a fourth input video frame (C4F2) to at least the first display controller 210, the second display controller 218, and the third display controller 226. In some examples, at least one(s) of the first display controller 210, the second display controller 218, and/or the third display controller 226 may store C4F2 in one(s) of the buffers 212, 214 of the first display controller 210, one(s) of the buffers 220, 222 of the second display controller 218, and/or one(s) of the buffers 228, 230 of the third display controller 226. At the fourth time 1124, the channel selector 246 deasserts the first channel select waveform 1106, which invokes and/or otherwise causes the second display channel 1112 and the fourth display channel 1116 to present dark frames.

At a fifth example time ($T_5$) 1126, the video sync 244 generates a rising edge of a fifth VSYNC pulse of the video synchronization waveform 1102. In response to the rising edge of the fifth VSYNC pulse at the fifth time 1126, the output data handler 242 outputs a fifth input video frame (C2F3) to at least the first display controller 210, the second display controller 218, and the third display controller 226. In some examples, at least one(s) of the first display controller 210, the second display controller 218, and/or the third display controller 226 may store C2F3 in one(s) of the buffers 212, 214 of the first display controller 210, one(s) of the buffers 220, 222 of the second display controller 218, and/or one(s) of the buffers 228, 230 of the third display controller 226.

At the fifth time 1126, the first display channel 1110 presents C1F1 in response to the deassertion of the first channel select waveform 1106. At the fifth time 1126, the channel selector 246 deasserts the second channel select waveform 1108, which invokes and/or otherwise causes the third display channel 1114 to present C3F1.

In this example, the second display channel 1112 displays C2F1 from the third time 1122 until the fourth time 1124. The time period spanning the third time 1122 and the fourth time 1124 corresponds to a frequency that is less than one-half (½) of a frequency of the VSYNC pulses of the video synchronization waveform 1102. Advantageously, the multi-channel display controller 102 may achieve the display of input video frames of the input video frame waveform 1104 on multiple display devices using a delayed display technique as illustrated in the eighth timing diagram 1100 by utilizing channel select waveforms for respective sets of the display channels.

Flowcharts representative of example hardware logic, machine readable instructions, hardware implemented state machines, and/or any combination thereof for implementing the multi-channel display controller 102 of FIGS. 1A-1C and/or 2, and/or, more generally, the multi-channel display system 200 of FIG. 2 are shown in FIGS. 12-16. The machine readable instructions may be one or more executable programs or portion(s) of an executable program for execution by a computer processor and/or processor circuitry, such as the processor 1712 shown in the example processor platform 1700 discussed below in connection with FIG. 17. The program may be embodied in software stored on a non-transitory computer readable storage medium such as a CD-ROM, a floppy disk, a hard drive, a DVD, a Blu-ray disk, or a memory associated with the processor 1712, but the entire program and/or parts thereof could alternatively be executed by a device other than the processor 1712 and/or embodied in firmware or dedicated hardware. Further, although the example program is described with reference to the flowcharts illustrated in FIGS. 12-16, many other methods of implementing the example multi-channel display controller 102 and/or the example multi-channel display system 200 may alternatively be used. For example, the order of execution of the blocks may be changed, and/or some of the blocks described may be changed, eliminated, or combined. Additionally or alternatively, any or all of the blocks may be implemented by one or more hardware circuits (such as discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (such as a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (such as portions of instructions, code, representations of code, etc.) that may be utilized to create, manufacture, and/or produce machine executable instructions. For example, the machine readable instructions may be fragmented and stored on one or more storage devices and/or computing devices (such as servers) located at the same or different locations of a network or collection of networks (such as in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (such as a dynamic link library (DLL)), a software development kit (SDK), an application programming interface (API), etc. in order to execute the instructions on a particular computing device or other device. In another example, the machine readable instructions may need to be configured (such as settings stored, data input, network addresses recorded, etc.) before the machine readable instructions and/or the corresponding program(s) may be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein may be represented by any past, present, or future instruction language, scripting language, programming language, etc. For example, the machine readable instructions may be represented using any of the following languages: assembly or machine language, C, C++, Java, C#, Perl, Python, JavaScript, HyperText Markup Language (HTML), Structured Query Language (SQL), Swift, etc.

As mentioned above, the example processes of FIGS. 12-16 may be implemented using executable instructions (such as computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (such as for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

Figure 12:
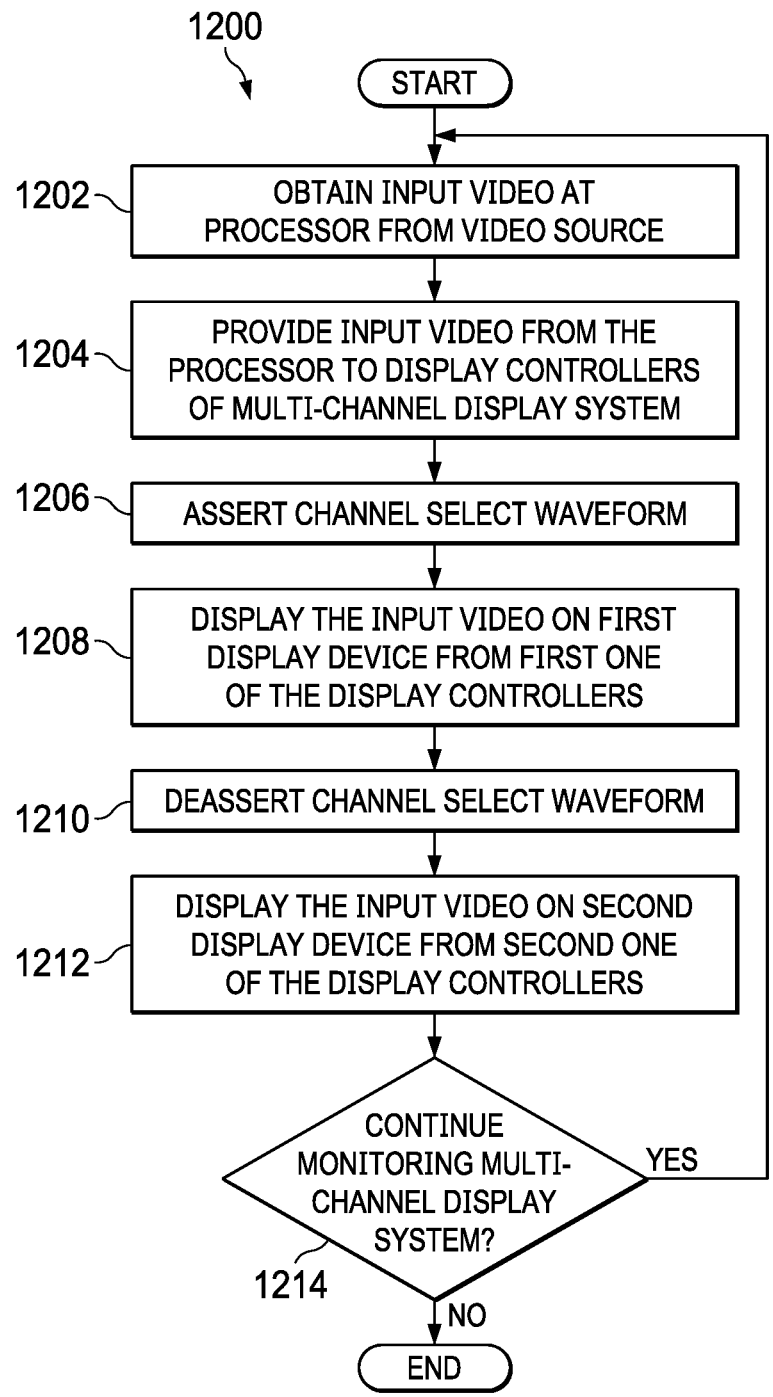
FIG. 12 is a flowchart representative of an example process that may be performed using machine readable instructions that may be executed and/or hardware configured to implement the example multi-channel display controller of FIGS. 1A-1C and/or 2 to implement an example pipelined display technique.

FIG. 12 is a flowchart representative of an example process 1200 that may be performed using machine readable instructions that may be executed and/or hardware configured to implement the multi-channel display controller 102 of FIGS. 1A-1C and/or 2 and/or the multi-channel display system 200 of FIG. 2 to implement an example pipelined display technique. In some examples, the process 1200 of FIG. 12 implements the first timing diagram 300 of FIG. 3. The process 1200 of FIG. 12 begins at block 1202, at which the multi-channel display controller 102 obtains input video from a video source. For example, the input data handler 240 (FIG. 2) may obtain the first input video 104 (FIGS. 1A-1C and/or 2).

At block 1204, the multi-channel display controller 102 provides input video to display controllers of a multi-channel display system. For example, the output data handler 242 (FIG. 2) may deliver the second input video 203 to one(s) of the display controllers 210, 218, 226 (FIG. 2).

At block 1206, the multi-channel display controller 102 asserts a channel select waveform. For example, the channel selector 246 (FIG. 2) may assert one(s) of the channel select waveforms 252 (FIG. 2).

At block 1208, the multi-channel display controller 102 displays the input video on a first display device from a first one of the display controllers. For example, in response to the assertion(s) of the one(s) of the channel select waveforms 252, the first display controller 210 may control the first display device 216 to display the second input video 203 or portion(s) thereof.

At block 1210, the multi-channel display controller 102 deasserts the channel select waveform. For example, the channel selector 246 may deassert the one(s) of the channel select waveforms 252.

At block 1212, the multi-channel display controller 102 causes the input video to be displayed on a second display device from a second one of the display controllers. For example, in response to the deassertion(s) of the one(s) of the channel select waveforms 252, the second display controller 218 may control the second display device 224 to display the second input video 203 or portion(s) thereof.

At block 1214, the multi-channel display controller 102 determines whether to continue monitoring the multi-channel display system. For example, the input data handler 240 may determine whether additional input video has been received. If, at block 1214, the multi-channel display controller 102 determines to continue monitoring the multi-channel display system, control returns to block 1202, otherwise the process 1200 of FIG. 12 concludes.

Figure 13:
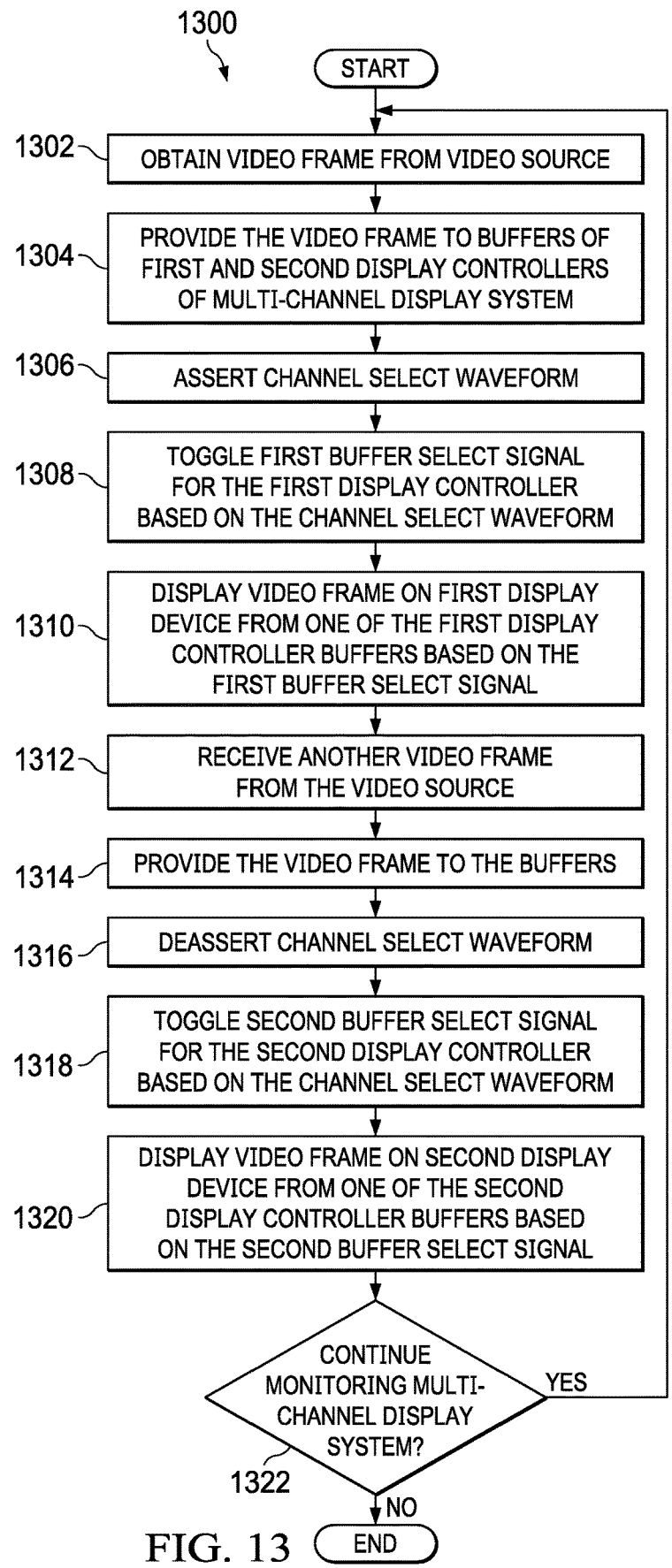
FIG. 13 is a flowchart representative of an example process that may be performed using machine readable instructions that may be executed and/or hardware configured to implement the example multi-channel display controller of FIGS. 1A-1C and/or 2 to implement an example pipelined display technique using example buffers.

FIG. 13 is a flowchart representative of an example process 1300 that may be performed using machine readable instructions that may be executed and/or hardware configured to implement the multi-channel display controller 102 of FIGS. 1A-1C and/or 2 and/or the multi-channel display system 200 of FIG. 2 to implement an example pipelined display technique using example buffers. In some examples, the process 1300 of FIG. 13 implements the second timing diagram 400 of FIG. 4. The process 1300 of FIG. 13 begins at block 1302, at which the multi-channel display controller 102 obtains a video frame from a video source. For example, the input data handler 240 (FIG. 2) may obtain a first video frame from a video source.

At block 1304, the multi-channel display controller 102 provides the video frame to buffers of first and second display controllers of a multi-channel display system. For example, the output data handler 242 (FIG. 2) may transmit the second input video 203 to (i) the first display controller 210, which may store the second input video 203 in at least one of the first buffer 212 or the second buffer 214, and/or (ii) the second display controller 218, which may store the second input video 203 in at least one of the first buffer 220 or the second buffer 222.

At block 1306, the multi-channel display controller 102 asserts a channel select waveform. For example, the channel selector 246 (FIG. 2) may assert the channel select waveform 406 (FIG. 4).

At block 1308, the multi-channel display controller 102 toggles a first buffer select signal for the first display controller based on the channel select waveform. For example, the first display controller 210 may assert the first buffer select waveform 408 (FIG. 4) from a logic low level (such as a voltage representative of a digital '0') to a logic high level (such as a voltage representative of a digital '1') in response to the assertion of the channel select waveform 406.

At block 1310, the first display device 216 displays the video frame from the first buffer 410 (FIG. 4) (such as the first buffer 212 of FIG. 2) based on the first buffer select signal. For example, the first display controller 210 may instruct the first display device 216 to display the first video frame stored in the first buffer 410 in response to the assertion of the first buffer select waveform 408.

At block 1312, the multi-channel display controller 102 receives another video frame from the video source. For example, the input data handler 240 may obtain a second video frame from the video source. In some examples, blocks 1310 and 1312 occur in parallel.

At block 1314, the multi-channel display controller 102 provides the video frame to the buffers. For example, the output data handler 242 may transmit the second input video 203 to (i) the first display controller 210, which may store the second input video 203 in at least one of the first buffer 212 or the second buffer 214, and/or (ii) the second display controller 218, which may store the second input video 203 in at least one of the first buffer 220 or the second buffer 222.

At block 1316, the multi-channel display controller 102 deasserts the channel select waveform. For example, the channel selector 246 may deassert the channel select waveform 406 from a logic high level to a logic low level.

At block 1318, the multi-channel display controller 102 toggles a second buffer select signal for the second display controller based on the channel select waveform. For example, the second display controller 218 may assert the second buffer select waveform 416 (FIG. 4) from a logic low level (such as a voltage representative of a digital '0') to a logic high level (such as a voltage representative of a digital '1') in response to the deassertion of the channel select waveform 406.

At block 1320, the second display device 224 displays the video frame from the third buffer 418 (FIG. 4) (such as the first buffer 220 of FIG. 2) based on the second buffer select signal. For example, the second display controller 218 may instruct the second display device 224 to display the second video frame stored in the third buffer 418 in response to the assertion of the second buffer select waveform 416.

At block 1322, the multi-channel display controller 102 determines whether to continue monitoring the multi-channel display system. For example, the input data handler 240 may determine whether additional input video has been received. If, at block 1322, the multi-channel display controller 102 determines to continue monitoring the multi-channel display system, control returns to block 1302, otherwise the process 1300 of FIG. 13 concludes.

Figure 14:
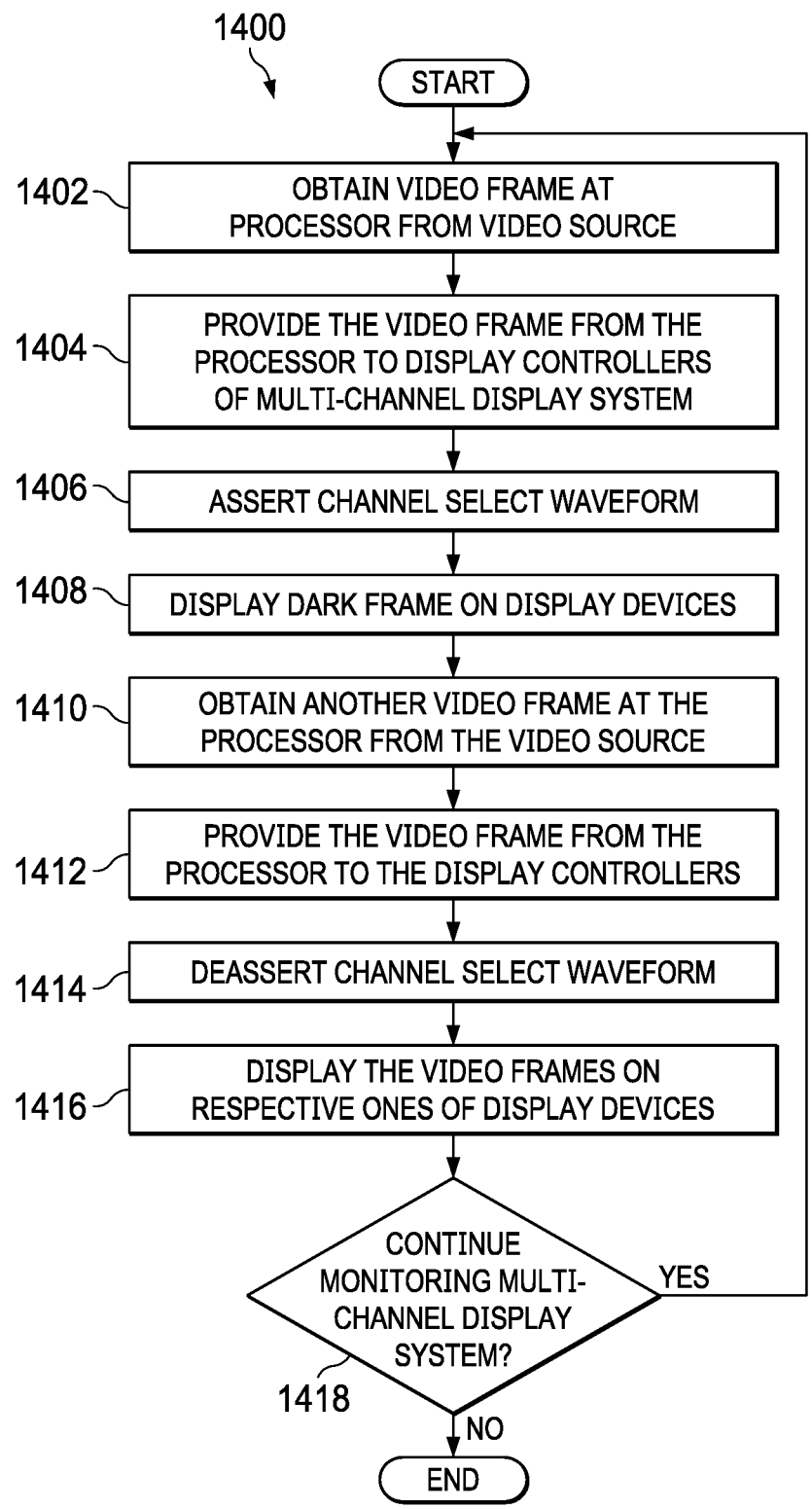
FIG. 14 is a flowchart representative of an example process that may be performed using machine readable instructions that may be executed and/or hardware configured to implement the example multi-channel display controller of FIGS. 1A-1C and/or 2 to implement an example delayed display technique.

FIG. 14 is a flowchart representative of an example process 1400 that may be performed using machine readable instructions that may be executed and/or hardware configured to implement the multi-channel display controller 102 of FIGS. 1A-1C and/or 2 and/or the multi-channel display system 200 of FIG. 2 to implement an example delayed display technique. In some examples, the process 1400 of FIG. 14 implements the third timing diagram 500 of FIG. 5. The process 1400 of FIG. 14 begins at block 1402, at which the multi-channel display controller 102 obtains a video frame from a video source. For example, the input data handler 240 (FIG. 2) may obtain a first video frame from a video source.

At block 1404, the multi-channel display controller 102 provides the video frame to display controllers of a multi-channel display system. For example, the output data handler 242 (FIG. 2) may deliver the second input video 203 to one(s) of the display controllers 210, 218, 226 (FIG. 2).

At block 1406, the multi-channel display controller 102 asserts a channel select waveform. For example, the channel selector 246 (FIG. 2) may assert one(s) of the channel select waveforms 252 (FIG. 2).

At block 1408, the multi-channel display controller 102 displays a dark frame on display devices. For example, the first display controller 210 may control the first display device 216 to display a dark frame and the second display controller 218 may control the second display device 224 to display a dark frame.

At block 1410, the multi-channel display controller 102 obtains another video frame from the video source. For example, the input data handler 240 may obtain a second video frame from the video source.

At block 1412, the multi-channel display controller 102 provides the video frame to the display controllers. For example, the output data handler 242 may deliver the second input video 203 to one(s) of the display controllers 210, 218, 226.

At block 1414, the multi-channel display controller 102 deasserts the channel select waveform. For example, the channel selector 246 may deassert one(s) of the channel select waveforms 252.

At block 1416, the multi-channel display controller 102 displays the video frames on respective ones of the display devices. For example, in response to the deassertion(s) of the one(s) of the channel select waveforms 252, the first display controller 210 may control the first display device 216 to display the first video frame and the second display controller 218 may control the second display device 224 to display the second video frame. In this example, the first display controller 210 may wait until the second display controller 218 obtains the second display frame for presentation.

At block 1418, the multi-channel display controller 102 determines whether to continue monitoring the multi-channel display system. For example, the input data handler 240 may determine whether an additional video frame has been received. If, at block 1418, the multi-channel display controller 102 determines to continue monitoring the multi-channel display system, control returns to block 1402, otherwise the process 1400 of FIG. 14 concludes.

Figure 15:
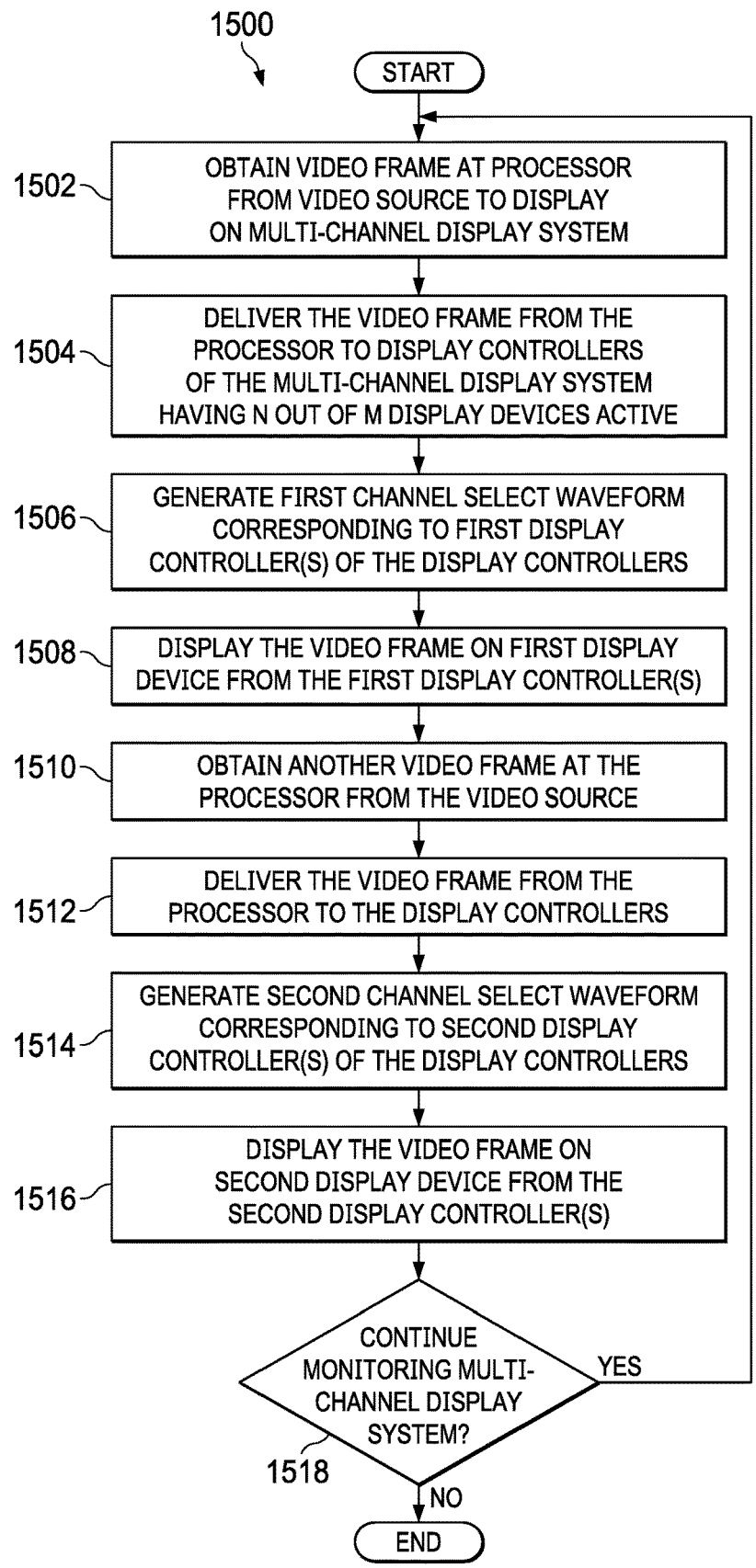
FIG. 15 is a flowchart representative of an example process that may be performed using machine readable instructions that may be executed and/or hardware configured to implement the example multi-channel display controller of FIGS. 1A-1C and/or 2 to implement an example pipelined display technique for a multi-channel display system having one or more display devices of the multi-channel display system active at a specified time.

FIG. 15 is a flowchart representative of an example process 1500 that may be performed using machine readable instructions that may be executed and/or hardware configured to implement the multi-channel display controller 102 of FIGS. 1A-1C and/or 2 and/or the multi-channel display system 200 of FIG. 2 to implement an example pipelined display technique using channel select waveforms for respective one(s) of display devices. In some examples, the process 1500 of FIG. 15 implements the fifth timing diagram 800 of FIG. 8 and/or the seventh timing diagram 1000 of FIG. 10. The process 1500 of FIG. 15 begins at block 1502, at which the multi-channel display controller 102 obtains a video frame from a video source to display on a multi-channel display system. For example, the input data handler 240 (FIG. 2) may obtain a first video frame from a video source.

At block 1504, the multi-channel display controller 102 delivers the video frame to display controllers of the multi-channel display system having N out of M display devices active. For example, the first multi-channel display system 100 of FIG. 1A may have one(s) of the display channels 108, 110, 112, 114 active while the remaining one(s) of the display channels 108, 110, 112, 114 are not active. In some examples, the output data handler 242 (FIG. 2) may transmit the second input video 203 to (i) the first display controller 210, which may store the second input video 203 in at least one of the first buffer 212 or the second buffer 214, and/or (ii) the second display controller 218, which may store the second input video 203 in at least one of the first buffer 220 or the second buffer 222.

At block 1506, the multi-channel display controller 102 generates a first channel select waveform corresponding to first display controller(s) of the display controllers. For example, the channel selector 246 (FIG. 2) may assert the second channel select waveform 808 (FIG. 8). In other examples, the channel selector 246 may assert the first channel select waveform 1006 (FIG. 10).

At block 1508, the multi-channel display controller 102 displays the video frame on a first display device from the first display controller(s). For example, the second display controller 218 may instruct the second display device 224 to display the first video frame in response to the assertion of the second channel select waveform 808. In other examples, the second display controller 218 may instruct the second display device 224 to display the video frame C2F1 in response to the assertion of the first channel select waveform 1006.

At block 1510, the multi-channel display controller 102 obtains another video frame from the video source. For example, the input data handler 240 may obtain a second video frame from the video source.

At block 1512, the multi-channel display controller 102 delivers the video frame to the display controllers. For example, the output data handler 242 may transmit the second input video 203 to (i) the first display controller 210, which may store the second input video 203 in at least one of the first buffer 212 or the second buffer 214, and/or (ii) the second display controller 218, which may store the second input video 203 in at least one of the first buffer 220 or the second buffer 222.

At block 1514, the multi-channel display controller 102 generates a second channel select waveform corresponding to second display controller(s) of the display controllers. For example, the channel selector 246 may assert the fourth channel select waveform 812 (FIG. 8). In other examples, the channel selector 246 may assert the second channel select waveform 1008 (FIG. 10).

At block 1516, the multi-channel display controller 102 displays the video frame on a second display device from the second display controller(s). For example, a fourth display controller of the multi-channel display system 200 may instruct a fourth display device of the multi-channel display system 200 to display the second video frame in response to the assertion of the fourth channel select waveform 812. In other examples, a fourth display controller of the multi-channel display system 200 may instruct a fourth display device of the multi-channel display system 200 to display the second video frame in response to the assertion of the second channel select waveform 1008.

At block 1518, the multi-channel display controller 102 determines whether to continue monitoring the multi-channel display system. For example, the input data handler 240 may determine whether additional input video has been received. If, at block 1518, the multi-channel display controller 102 determines to continue monitoring the multi-channel display system, control returns to block 1502, otherwise the process 1500 of FIG. 15 concludes.

Figure 16:
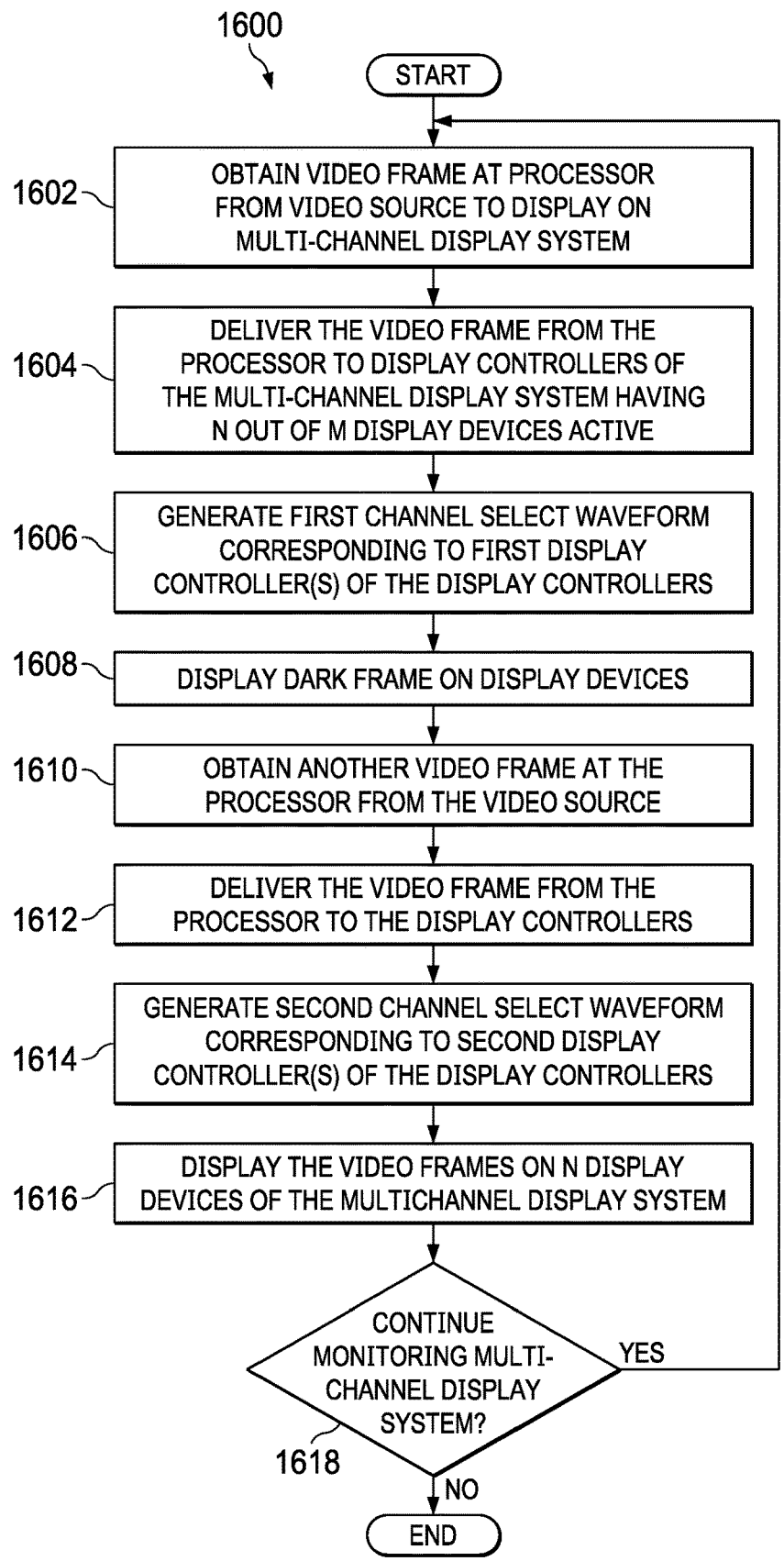
FIG. 16 is a flowchart representative of an example process that may be performed using machine readable instructions that may be executed and/or hardware configured to implement the example multi-channel display controller of FIGS. 1A-1C and/or 2 to implement an example delayed display technique for a multi-channel display system having one or more display devices of the multi-channel display system active at a specified time.

FIG. 16 is a flowchart representative of an example process 1600 that may be performed using machine readable instructions that may be executed and/or hardware configured to implement the multi-channel display controller 102 of FIGS. 1A-1C and/or 2 and/or the multi-channel display system 200 of FIG. 2 to implement an example delayed display technique using channel select waveforms for respective one(s) of display devices. In some examples, the process 1600 of FIG. 16 implements the sixth timing diagram 900 of FIG. 9 and/or the eighth timing diagram 1100 of FIG. 11. The process 1600 of FIG. 16 begins at block 1602, at which the multi-channel display controller 102 obtains a video frame from a video source to display on a multi-channel display system. For example, the input data handler 240 (FIG. 2) may obtain a first video frame from a video source.

At block 1604, the multi-channel display controller 102 delivers the video frame to display controllers of the multi-channel display system having N out of M display devices active. For example, the first multi-channel display system 100 of FIG. 1A may have ones) of the display channels 108, 110, 112, 114 active while the remaining one(s) of the display channels 108, 110, 112, 114 are not active. In some examples, the output data handler 242 (FIG. 2) may transmit the second input video 203 to (i) the first display controller 210, which may store the second input video 203 in at least one of the first buffer 212 or the second buffer 214, and/or (ii) the second display controller 218, which may store the second input video 203 in at least one of the first buffer 220 or the second buffer 222.

At block 1606, the multi-channel display controller 102 generates a first channel select waveform corresponding to first display controller(s) of the display controllers. For example, the channel selector 246 (FIG. 2) may assert the second channel select waveform 908 (FIG. 9). In other examples, the channel selector 246 may assert the first channel select waveform 1106 (FIG. 11).

At block 1608, the multi-channel display controller 102 displays a dark frame on display devices. For example, the first display controller 210 may instruct the first display device 216 to display a dark frame in response to the assertion of the second channel select waveform 908. In other examples, the second display controller 218 may instruct the second display device 224 to display a first dark frame and a fourth display controller of the multi-channel display system 200 to instruct a fourth display device of the multi-channel display system 200 to display a second dark frame in response to the assertion of the first channel select waveform 1106.

At block 1610, the multi-channel display controller 102 obtains another video frame from the video source. For example, the input data handler 240 may obtain a second video frame from the video source.

At block 1612, the multi-channel display controller 102 delivers the video frame to the display controllers. For example, the output data handler 242 may transmit the second input video 203 to (i) the first display controller 210, which may store the second input video 203 in at least one of the first buffer 212 or the second buffer 214, and/or (ii) the second display controller 218, which may store the second input video 203 in at least one of the first buffer 220 or the second buffer 222.

At block 1614, the multi-channel display controller 102 generates a second channel select waveform corresponding to second display controller(s) of the display controllers. For example, the channel selector 246 may assert the fourth channel select waveform 912 (FIG. 9). In other examples, the channel selector 246 may assert the second channel select waveform 1108 (FIG. 11).

At block 1616, the multi-channel display controller 102 displays the video frames on N of display devices of the multi-channel display system. For example, the second display controller 218 may instruct the second display device 224 to display the first video frame and the fourth display controller may instruct the fourth display device to display the second video frame in response to the assertion of the fourth channel select waveform 912. In other examples, the second display controller 218 may instruct the second display device 224 to display the first video frame and the fourth display controller may instruct the fourth display device to display the second video frame in response to the assertion of the second channel select waveform 1108.

At block 1618, the multi-channel display controller 102 determines whether to continue monitoring the multi-channel display system. For example, the input data handler 240 may determine whether additional input video has been received. If, at block 1618, the multi-channel display controller 102 determines to continue monitoring the multi-channel display system, control returns to block 1602, otherwise the process 1600 of FIG. 16 concludes.

Figure 17:
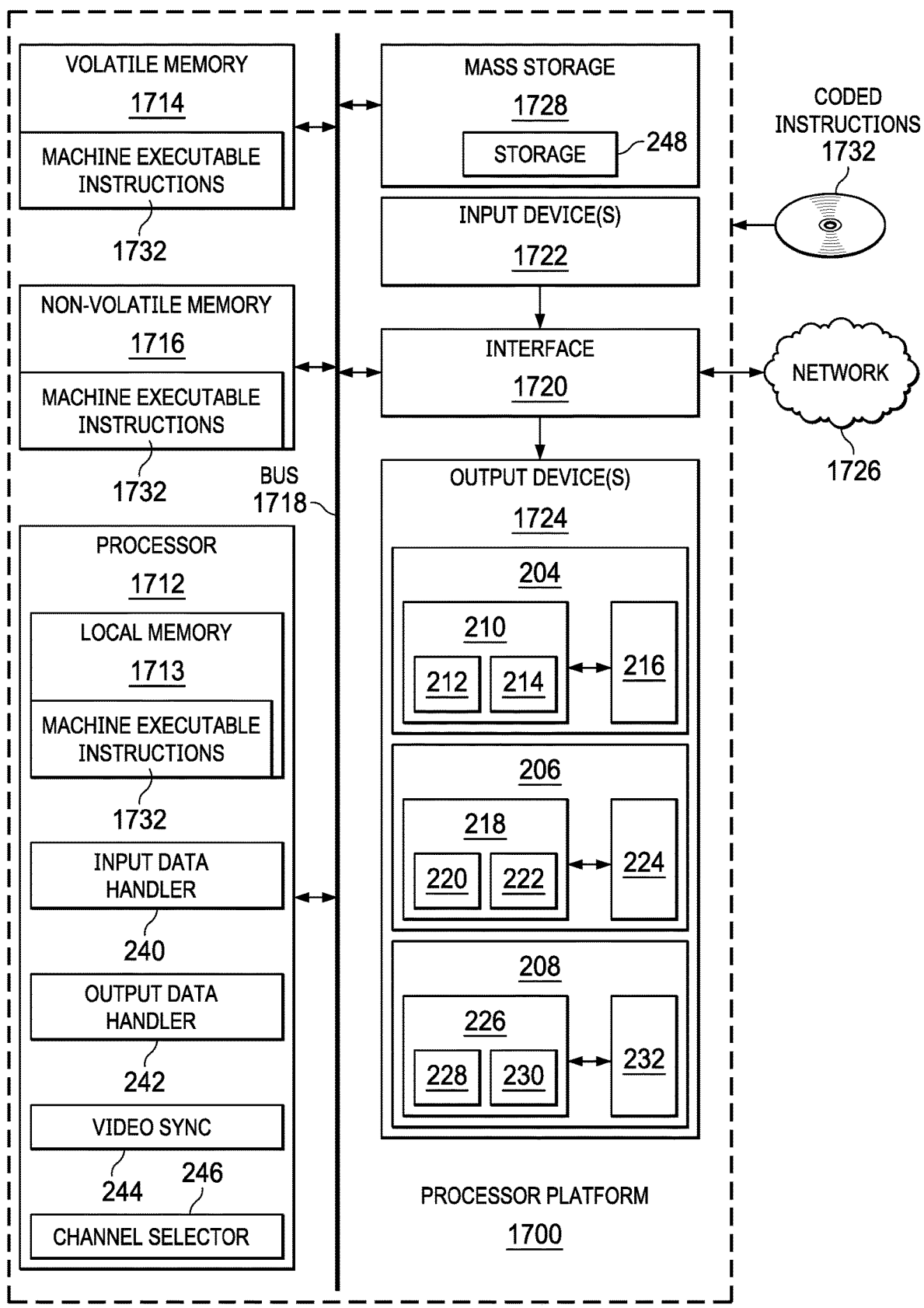
FIG. 17 is a block diagram of an example processing platform structured to execute the instructions of FIGS. 12-17 to implement the example multi-channel display controller of FIGS. 1A-1C and/or 2.

FIG. 17 is a block diagram of an example processor platform 1700 structured to execute the instructions of FIGS. 12-16 to implement the multi-channel display controller 102 of FIGS. 1A-1C and/or 2 and/or the multi-channel display system 200 of FIG. 2. The processor platform 1700 may be, for example, a monitor, a television, a video wall, a server, a personal computer, a workstation, a self-learning machine (such as a neural network), an Internet appliance, a gaming console, a headset (such as an AR or VR headset display, an AR or VR head-mounted display, etc.) or other wearable device, or any other type of computing device.

The processor platform 1700 of the illustrated example includes a processor 1712. The processor 1712 of the illustrated example is hardware. For example, the processor 1712 may be implemented by one or more integrated circuits, logic circuits, microprocessors, GPUs, DSPs, or controllers from any desired family or manufacturer. The hardware processor may be a semiconductor based (such as silicon based) device. In this example, the processor 1712 implements the example input data handler 240, the example output data handler 242, the example video sync 244, and the example channel selector 246 of FIG. 2.

The processor 1712 of the illustrated example includes a local memory 1713 (such as a cache). The processor 1712 of the illustrated example is in communication with a main memory including a volatile memory 1714 and a non-volatile memory 1716 via a bus 1718. The volatile memory

1714 may be implemented by SDRAM, DRAM, RDRAM®, and/or any other type of random access memory device. The non-volatile memory 1716 may be implemented by flash memory and/or any other desired type of memory device. Access to the main memory 1714, 1716 is controlled by a memory controller. In some examples, the bus 1718 implements the bus 250 of FIG. 2.

The processor platform 1700 of the illustrated example also includes an interface circuit 1720. The interface circuit 1720 may be implemented by any type of interface standard, such as an Ethernet interface, a USB interface, a Bluetooth® interface, a near field communication (NFC) interface, and/or a PCI express interface. In some examples, the interface circuit 1720 receives and/or otherwise obtains the first input video 104 of FIGS. 1A-2.

In the illustrated example, one or more input devices 1722 are connected to the interface circuit 1720. The input device(s) 1722 permit(s) a user to enter data and/or commands into the processor 1712. The input device(s) may be implemented by, for example, an audio sensor, a microphone, a camera (still or video), a keyboard, a button, a mouse, a touchscreen, a track-pad, a trackball, an isopoint device, and/or a voice recognition system.

One or more output devices 1724 are also connected to the interface circuit 1720 of the illustrated example. The output devices 1724 may be implemented, for example, by display devices (such as an LED display device, an OLED display device, an LCD device, a CRT display device, an in-place switching (IPS) display device, a touchscreen device, a spatial light modulator (such as a DMD), an LCoS display device, a PLM device, etc.), a tactile output device, a printer, and/or speaker. The interface circuit 1720 of the illustrated example, thus, typically includes a graphics driver card, a graphics driver chip and/or a graphics driver processor.

In this example, the one or more output devices 1724 include and/or otherwise implement at least the first display channel 204, the second display channel 206, and the third display channel 208 of FIG. 2. In this example, the first display channel 204 includes and/or otherwise implements the first display controller 210 and the first display device 216 of FIG. 2. In this example, the first display controller 210 includes and/or otherwise implements the buffers 212, 214 of FIG. 2. In this example, the second display channel 206 includes and/or otherwise implements the second display controller 218 and the second display device 224 of FIG. 2. In this example, the second display controller 218 includes and/or otherwise implements the buffers 220, 222 of FIG. 2. In this example, the third display channel 208 includes and/or otherwise implements the third display controller 226 and the third display device 232 of FIG. 2. In this example, the third display controller 226 includes and/or otherwise implements the buffers 228, 230 of FIG. 2.

In some examples, at least one of the first display controller 210, the buffers 212, 214, or the first display device 216, and/or, more generally, the first display channel 204, may implement one of the output device(s) 1724. For example, the at least one of the first display controller 210, the buffers 212, 214, or the first display device 216, and/or, more generally, the first display channel 204 may be implemented by one or more display devices, such as an LED display device, an OLED display device, an LCD device, a CRT display device, an IPS display device, a touchscreen device, a spatial light modulator (such as a DMD or an LCoS display device), a PLM device, etc.

In some examples, at least one of the second display controller 218, the buffers 220, 222, or the second display device 224, and/or, more generally, the second display channel 206, may implement one of the output device(s) 1724.

For example, the at least one of the second display controller 218, the buffers 220, 222, or the second display device 224, and/or, more generally, the second display channel 206, may be implemented by one or more display devices, such as an LED display device, an OLED display device, an LCD device, a CRT display device, an IPS display device, a touchscreen device, a spatial light modulator (such as a DMD or an LCoS display device), a PLM device, etc.

In some examples, at least one of the third display controller 226, the buffers 228, 230, or the third display device 232, and/or, more generally, the third display channel 208, may implement one of the output device(s) 1724. For example, the at least one of the third display controller 226, the buffers 228, 230, or the third display device 232, and/or, more generally, the third display channel 208, may be implemented by one or more display devices, such as an LED display device, an OLED display device, an LCD device, a CRT display device, an IPS display device, a touchscreen device, a spatial light modulator (such as a DMD or an LCoS display device), a PLM device, etc.

In some examples, the output device(s) 1724 may implement the first multi-channel display system 100, the second multi-channel display system 120, and/or the third multi-channel display system 140 of FIGS. 1A-1C, and/or portion(s) thereof. In some examples, the output device(s) 1724 may implement the multi-channel display system 200 of FIG. 2 or portion(s) thereof.

The interface circuit 1720 of the illustrated example also includes a communication device such as a transmitter, a receiver, a transceiver, a modem, a residential gateway, a wireless access point, and/or a network interface to facilitate exchange of data with external machines (such as computing devices of any kind) via a network 1726. The communication may be via, for example, an Ethernet connection, a digital subscriber line (DSL) connection, a telephone line connection, a coaxial cable system, a satellite system, a line-of-site wireless system, a cellular telephone system, etc.

The processor platform 1700 of the illustrated example also includes one or more mass storage devices 1728 for storing software and/or data. Examples of such mass storage devices 1728 include floppy disk drives, hard drive disks, compact disk drives, Blu-ray disk drives, redundant array of independent disks (RAID) systems, and digital versatile disk (DVD) drives. In this example, the mass storage devices 1728 implement the storage 248 of FIG. 2.

The machine executable instructions 1732 of FIGS. 12-16 may be stored in the mass storage device 1728, in the volatile memory 1714, in the non-volatile memory 1716, and/or on a removable non-transitory computer readable storage medium such as a CD or DVD.

In this description, the term "and/or" (when used in a form such as A, B and/or C) refers to any combination or subset of A, B, C, such as: (a) A alone; (b) B alone; (c) C alone; (d) A with B; (e) A with C; (f) B with C; and (g) A with B and with C. Also, as used herein, the phrase "at least one of A or B" (or "at least one of A and B") refers to implementations including any of: (a) at least one A; (b) at least one B; and (c) at least one A and at least one B.

Example methods, apparatus and articles of manufacture described herein improves multi-channel display systems. Advantageously, the use of a single FE processor may reduce the power consumption, monetary cost, and size footprint of such multi-channel display systems. Advantageously, the single FE processor may improve synchronization of input frames for multiple display channels as input video may be transmitted to multiple display controllers at a specified time.

Example multi-channel display systems are disclosed herein. Further examples and combinations thereof include the following:

Example 1 includes an apparatus comprising at least one processor to execute instructions to at least in response to determining that a first display controller is to provide at least a first portion of video data on a first channel, provide a first control signal to the first display controller instructing the first display controller to provide the at least the first portion of the video data on the first channel, and in response to determining that a second display controller is to provide at least a second portion of the video data on a second channel, provide a second control signal to the second display controller instructing the second display controller to provide the at least the second portion of the video data on the second channel, the second channel different from the first channel.

Example 2 includes the apparatus of example 1, wherein the at least one processor is configured to obtain the first portion of the video data and the second portion of the video data and to provide the first portion and the second portion at a first frequency, and determine that the first display controller is to provide the first portion based on a synchronization signal having the first frequency.

Example 3 includes the apparatus of example 1, wherein the video data comprises a first video frame and a second video frame, the first display controller comprises a first buffer and a second buffer, the second display controller comprises a third buffer and a fourth buffer, the first control signal has a rising edge and a falling edge, and the at least one processor is configured to provide the first video frame to the first display controller and to the second display controller in response to a first synchronization signal, the first display controller configured to store the first video frame in the first buffer, the second display controller configured to store the first video frame in the third buffer, produce a first buffer read signal in response to the rising edge, the first display controller configured to provide the first video frame on the first channel from the first buffer in response to the first buffer read signal, provide the second video frame to the first display controller and to the second display controller in response to a second synchronization signal after the first synchronization signal, the first display controller configured to store the second video frame in the second buffer, the second display controller configured to store the second video frame in the third buffer, and assert a second buffer read signal in response to the falling edge, the second display controller configured to provide the second video frame on the second channel from the third buffer in response to the second buffer read signal.

Example 4 includes the apparatus of example 3, wherein the video data comprises a third video frame, and the processor is configured to provide the third video frame to the first display controller and to the second display controller in response to a third synchronization signal after the second synchronization signal, the first display controller configured to store the third video frame in the second buffer, the second display controller configured to store the third video frame in the fourth buffer.

Example 5 includes the apparatus of example 1, wherein the video data includes a first video frame and a second video frame, the control signal has a rising edge and a falling edge, and the at least one processor is configured to cause the first display controller to provide the first video frame on the first channel in response to the rising edge, and the second display controller to provide the second video frame on the second channel in response to the falling edge.

Example 6 includes the apparatus of example 1, wherein the video data includes a first video frame and a second video frame, the control signal has a rising edge and a falling edge, and the at least one processor is configured to cause the first display controller to provide a first dark video frame in response to the rising edge, the second display controller to provide a second dark video frame in response to the rising edge, the first display controller to provide the first video frame on the first channel in response to the falling edge, and the second display controller to provide the second video frame on the second channel in response to the falling edge.

Example 7 includes the apparatus of example 1, wherein the at least one processor is configured to provide the video data the first display controller, the second display controller, a third display controller, and a fourth display controller, cause the first display controller to provide the video data on the first channel in response to the control signal, cause the second display controller to provide dark video data on the second channel in response to the control signal, cause the third display controller to provide the video data on a third channel in response to the control signal, and cause the fourth display controller to provide the dark video data on a fourth channel in response to the control signal.

Example 8 includes a system comprising a first display device, a first display controller coupled to the first display device, a second display device, a second display controller coupled to the second display device, and at least one processor coupled to the first display controller and to the second display controller, the at least one processor configured to provide video data to the first display controller and to the second display controller, in response to determining that the first display controller is to instruct the first display device to display at least a first portion of video data, provide a first control signal to the first display controller, wherein the first display controller is configured to, responsive to receiving the first control signal, instruct the first display device to display the at least the first portion of the video data, and in response to determining that the second display controller is to instruct the second display device to display at least a second portion of the video data, provide a second control signal to the second display controller, wherein the second display controller is configured to, responsive to receiving the second control signal, instruct the second display device to display the at least the second portion of the video data.

Example 9 includes the system of example 8, Wherein the at least one processor is configured to receive the at least the first portion of the video data and the at least the second portion of the video data at a first frequency, provide the at least the first portion of the video data to the first display controller at the first frequency, and the first display device is configured to display the at least the first portion of the video data at the first frequency.

Example 10 includes the system of example 8, wherein the video data includes a first video frame and a second video frame, the first display controller includes a first buffer and a second buffer, the second display controller includes a third buffer and a fourth buffer, the control signal has a rising edge and a falling edge, and the at least one processor is configured to provide the first video frame to the first display controller and the second display controller in response to a first synchronization signal, the first display controller to store the first video frame in the first buffer, the second display controller to store the first video frame in the third buffer, and assert a first buffer read signal in response to the rising edge, the first display controller to display the first video frame in the first buffer on the first display device in response to the first buffer read signal.

Example 11 includes the system of example 10, wherein the at least one processor is configured to provide the second video frame to the first display controller and the second display controller in response to a second synchronization signal after the first synchronization signal, the first display controller to store the second video frame in the second buffer, the second display controller to store the second video frame in the third buffer, and assert a second buffer read signal in response to the falling edge, the second display controller to display the second video frame in the third buffer on the second display device in response to the second buffer read signal.

Example 12 includes the system of example 8, wherein the video data includes a first video frame, a second video frame, and a third video frame, and the at least one processor is configured to provide the first video frame to the first display controller and the second display controller at a first time, the first display controller to display the first video frame on the first display device at the first time, provide the second video frame to the first display controller and the second display controller at a second time after the first time, the first display controller to display the first video frame on the first display device at the second time, the second display controller to display the second video frame on the second display device at the second time, and provide the third video frame to the first display controller and the second display controller at a third time after the second time, the first display controller to display the third video frame on the first display device at the third time, the second display controller to display the second video frame on the second display device at the third time.

Example 13 includes the system of example 8, wherein the video data includes a first video frame and a second video frame, the control signal has a rising edge and a falling edge, the first display controller to display the first video frame on the first display device in response to the rising edge, and the second display controller is configured to display the second video frame on the second display device in response to the falling edge.

Example 14 includes the system of example 8, wherein the video data includes a first video frame and a second video frame, the control signal has a rising edge and a falling edge, and wherein the first display controller to display a first dark video frame on the first display device in response to the rising edge, the second display controller to display a second dark video frame on the second display device in response to the rising edge, the first display controller to display the first video frame on the first display device in response to the falling edge, and the second display controller to display the second video frame on the second display device in response to the falling edge.

Example 15 includes the system of example 8, wherein the control signal is a first control signal, and further including a third display device, a fourth display device, a third display controller coupled to the third display device, and a fourth display controller coupled to the fourth display device, the at least one processor to provide the video data to the first display controller, the second display controller, the third display controller, and the fourth display controller, and wherein the first display controller is configured to display the video data on the first display device in response to the first control signal, the second display controller is configured to display first dark video data on the second display device in response to the first control signal, the third display controller is configured to display the video data on the third display device in response to a second control signal, and the fourth display controller is configured to display second dark video data on the fourth display device in response to the second control signal.

Example 16 includes the system of example 8, wherein the control signal is a first control signal, and further including a third display device, a fourth display device, a third display controller coupled to the third display device, and a fourth display controller coupled to the fourth display device, the at least one processor to provide the video data to the first display controller, the second display controller, the third display controller, and the fourth display controller, and wherein the first display controller is configured to display the video data on the first display device in response to the first control signal, the second display controller is configured to display first dark video data on the second display device, the third display controller is configured to display the video data on the third display device in response to a second control signal, and the fourth display controller is configured to display second dark video data on the fourth display device.

Example 17 includes a method comprising in response to determining that a first display controller is to provide at least a first portion of video data on a first channel, providing a first control signal to the first display controller instructing the first display controller to provide the at least the first portion of the video data on the first channel, and in response to determining that a second display controller is to provide at least a second portion of the video data on a second channel, providing a second control signal to the second display controller instructing the second display controller to provide the at least the second portion of the video data on the second channel, the second channel different from the first channel.

Example 18 includes the method of example 17, wherein the video data includes a first video frame, a second video frame, and a third video frame, and further including providing the first video frame to the first display controller and the second display controller at a first time, displaying the first video frame on the first display device at the first time, providing the second video frame to the first display controller and the second display controller at a second time after the first time, displaying the first video frame on the first display device at the second time and the second video frame on the second display device at the second time, providing the third video frame to the first display controller and the second display controller at a third time after the second time, and displaying the third video frame on the first display device and the second video frame on the second display device at the third time.

Example 19 includes the method of example 17, wherein the video data includes a first video frame and a second video frame, the control signal has a rising edge a falling edge, the first display controller to display the first video frame on the first display device in response to the rising edge, and the second display controller is configured to display the second video frame on the second display device in response to the falling edge.

Example 20 includes the method of example 17, wherein the video data includes a first video frame and a second video frame, the control signal has a rising edge and a falling edge, and further including displaying a first dark video frame on the first display device in response to the rising edge, displaying a second dark video frame on the second display device in response to the rising edge, displaying the first video frame on the first display device in response to the falling edge, and displaying the second video frame on the second display device in response to the falling edge.

Example 21 includes the method of example 17, wherein the control signal is a first control signal, and further including providing the video data to the first display controller, the second display controller, a third display controller, and a fourth display controller, displaying the video data on the first display device in response to the first control signal, displaying first dark video data on the second display device in response to the first control signal, displaying the video data on a third display device in response to a second control signal, and displaying second dark video data on a fourth display device in response to the second control signal.

Example 22 includes the method of example 17, wherein the control signal is a first control signal, and further including providing the video data to the first display controller, the second display controller, a third display controller, and a fourth display controller, causing the first display controller to display the video data on the first display device in response to the first control signal, causing the second display controller to display first dark video data on the second display device, causing the third display controller to display the video data on a third display device in response to a second control signal, and causing the fourth display controller to display second dark video data on a fourth display device.

Modifications are possible in the described embodiments, and other embodiments are possible, within the scope of the claims.

What is claimed is:

1. A multi-channel controller configured to:
provide a channel select waveform to a first display controller and to a second display controller, the channel select waveform having a first waveform feature and a second waveform feature, wherein the first waveform feature is a rising edge or a falling edge; and
the channel select waveform configured to:
  instruct, cased on the first waveform feature, the first display controller to provide at least a first portion of video data on a first channel; and
  instruct, based on the second waveform feature, the second display controller to provide at least a second portion of the video data on a second channel, the second channel different from the first channel;
  whereing the video data includes a first video frame and a second video frame, the first waveform feature is a rising edge and the second waveform feature is a falling edge, and the multi-channel controller is configured to instruct:
    the first display controller to provide the first video frame on the first channel in response to the rising edge, and
    the second display controller to provide the second video frame on the second channel in response to the falling edge.

2. The multi-channel controller of claim 1, further configured to:
obtain the first portion of the video data and the second portion of the video data;
provide the first portion of the video data and the second portion of the video data at a frequency; and
determine that the first display controller is to provide the first portion of the video data based on a synchronization signal having the frequency.

3. The multi-channel controller of claim 1, wherein the video data comprises a first video frame and a second video frame, the first display controller comprises a first buffer and a second buffer, the second display controller comprises a third buffer and a fourth buffer, the first waveform feature is a rising edge, the second waveform feature is a falling edge, and the multi-channel controller is further configured to:
provide the first video frame to the first display controller and to the second display controller in response to a first synchronization signal, the first display controller configured to store the first video frame in the first buffer, the second display controller configured to store the first video frame in the third buffer;
produce a first buffer read signal in response to the rising edge, the first display controller configured to provide the first video frame on the first channel from the first buffer in response to the first buffer read signal;
provide the second video frame to the first display controller and to the second display controller in response to a second synchronization signal after the first synchronization signal, the first display controller configured to store the second video frame in the second buffer, the second display controller configured to store the second video frame in the third buffer; and
assert a second buffer read signal in response to the falling edge, the second display controller configured to provide the second video frame on the second channel from the third buffer in response to the second buffer read signal.

4. The multi-channel controller of claim 3, wherein the video data comprises a third video frame, and the multi-channel controller is further configured to provide the third video frame to the first display controller and to the second display controller in response to a third synchronization signal after the second synchronization signal, the first display controller configured to store the third video frame in the second buffer, the second display controller configured to store the third video frame in the fourth buffer.

5. The multi-channel controller of claim 1, wherein the video data includes a first video frame and a second video frame, the first waveform feature is a rising edge and the second waveform feature is a falling edge, and the multi-channel controller is configured to instruct:
the first display controller to provide a first dark video frame in response to the rising edge;
the second display controller to provide a second dark video frame in response to the rising edge;
the first display controller to provide the first video frame on the first channel in response to the falling edge; and
the second display controller to provide the second video frame on the second channel in response to the falling edge.

6. The multi-channel controller of claim 1, wherein the multi-channel controller is further configured to:
provide the video data to the first display controller, the second display controller, a third display controller, and a fourth display controller;
instruct the first display controller to provide the video data on the first channel in response to the channel select waveform;
instruct the second display controller to provide dark video data on the second channel in response to the channel select waveform;
instruct the third display controller to provide the video data on a third channel in response to the channel select waveform; and instruct the fourth display controller to provide the dark video data on a fourth channel in response to the channel select waveform.

7. A system comprising:
a first display device;
a first display controller coupled to the first display device;
a second display device;
a second display controller coupled to the second display device; and
at least one processor coupled to the first display controller and to the second display controller, the at least one processor configured to:
provide video data to the first display controller and to the second display controller; and
provide a channel select waveform to the first display controller and to the second display controller, the channel select waveform having a first waveform feature and a second waveform feature;
wherein the first display controller is configured to, responsive to receiving the first waveform feature the channel select waveform, instruct the first display device to display at least a first portion of the video data; and
wherein the second display controller is configured to, responsive to receiving the second waveform feature of the channel select waveform, instruct the second display device to display at least a second portion of the video data;
wherein the video data includes a first video frame and a second video frame, the first waveform feature is a rising edge and the second waveform feature is a falling edge, the first display controller is configured to display the first video frame on the first display device in response to the rising edge, and the second display controller is configured to display the second video frame on the second display device in response to the falling edge.

8. The system of claim 7, wherein the at least one processor is configured to receive the at least the first portion of the video data and the at least the second portion of the video data at a frequency, provide the at least the first portion of the video data to the first display controller at the frequency, and the first display device is configured to display the at least the first portion of the video data at the frequency.

9. The system of claim 7, wherein the video data includes a first video frame and a second video frame, the first display controller includes a first buffer and a second buffer, the second display controller includes a third buffer and a fourth buffer, the first waveform feature is a rising edge and the second waveform feature is a falling edge, and the at least one processor is configured to:
provide the first video frame to the first display controller and to the second display controller in response to a first synchronization signal, the first display controller configured to store the first video frame in the first buffer, the second display controller configured to store the first video frame in the third buffer; and
assert a buffer read signal in response to the rising edge, the first display controller configured to display the first video frame in the first buffer on the first display device in response to the buffer read signal.

10. The system of claim 9, wherein the at least one processor is configured to:
provide the second video frame to the first display controller and to the second display controller in response to a second synchronization signal after the first synchronization signal, the first display controller configured to store the second video frame in the second buffer, the second display controller configured to store the second video frame in the third buffer; and
assert a second buffer read signal in response to the falling edge, the second display controller configured to display the second video frame in the third buffer on the second display device in response to the second buffer read signal.

11. The system of claim 7, wherein the video data includes a first video frame, a second video frame, and a third video frame, and the at least one processor is configured to:
provide the first video frame to the first display controller and the second display controller at a first time, the first display controller configured to display the first video frame on the first display device at the first time;
provide the second video frame to the first display controller and the second display controller at a second time after the first time, the first display controller configured to display the first video frame on the first display device at the second time, the second display controller configured to display the second video frame on the second display device at the second time; and
provide the third video frame to the first display controller and the second display controller at a third time after the second time, the first display controller configured to display the third video frame on the first display device at the third time, the second display controller configured to display the second video frame on the second display device at the third time.

12. The system of claim 7, wherein the video data includes a first video frame and a second video frame, the first waveform feature is a rising edge and the second waveform feature is a falling edge, and wherein:
the first display controller is configured to display a first dark video frame on the first display device in response to the rising edge;
the second display controller is configured to display a second dark video frame on the second display device in response to the rising edge;
the first display controller is configured to display the first video frame on the first display device in response to the falling edge; and
the second display controller is configured to display the second video frame on the second display device in response to the falling edge.

13. The system of claim 7, wherein the channel select waveform is a first channel select waveform, the system further comprising a third display device, a fourth display device, a third display controller coupled to the third display device and to the at least one processor, and a fourth display controller coupled to the fourth display device and to the at least one processor, the at least one processor configured to provide the video data to the first display controller, the second display controller, the third display controller, and the fourth display controller, and wherein:
the first display controller is configured to display the video data on the first display device in response to the first channel select waveform;
the second display controller is configured to display first dark video data on the second display device in response to the first channel select waveform;
the third display controller is configured to display the video data on the third display device in response to a second channel select waveform; and the fourth display controller is configured to display second dark video data on the fourth display device in response to the second channel select waveform.

14. The system of claim 7, wherein the channel select waveform is a first channel select waveform, and the system further comprising a third display device, a fourth display device, a third display controller coupled to the third display device and to the at least one processor, and a fourth display controller coupled to the fourth display device and to the at least one processor, the at least one processor configured to provide the video data to the first display controller, the second display controller, the third display controller, and the fourth display controller, and wherein:
the first display controller is configured to display the video data on the first display device in response to the first channel select waveform;
the second display controller is configured to display first dark video data on the second display device;
the third display controller is configured to display the video data on the third display device in response to a second channel select waveform; and
the fourth display controller is configured to display second dark video data on the fourth display device.

15. A method comprising:
providing, by at least one processor, a channel select waveform to a first display controller and to a second display controller, the channel select waveform having a first waveform feature and a second waveform feature, wherein the first waveform feature is a rising edge or a falling edge; and
the channel select waveform configured to:
instruct, based on the first waveform feature, the first display controller to provide at least a first portion of video data on a first channel; and
instruct, based on the second waveform feature, the second display controller to provide at least a second portion of the video data on a second channel, the second channel different from the first channel;
wherein the video data includes a first video frame and a second video frame, the first waveform feature is a rising edge and the second waveform feature is a falling edge, the method further comprising: displaying, by the first display controller, the first video frame on a first display device in response to the rising edge; and displaying, by the second display controller, the second video frame on a second display device in response to the falling edge.

16. The method of claim 15, wherein the video data includes a first video frame, a second video frame, and a third video frame, the method further comprising:
providing, by the at least one processor, the first video frame to the first display controller and to the second display controller at a first time;
displaying the first video frame on a first display device at the first time;
providing the second video frame to the first display controller and to the second display controller at a second time after the first time;
displaying the first video frame on the first display device at the second time and displaying the second video frame on a second display device at the second time;
providing, by the at least one processor, the third video frame to the first display controller and to the second display controller at a third time after the second time; and
displaying the third video frame on the first display device and displaying the second video frame on the second display device at the third time.

17. The method of claim 15, wherein the video data includes a first video frame and a second video frame, the first waveform feature is a rising edge and the second waveform feature is a falling edge, and the method further comprising:
displaying a first dark video frame on a first display device in response to the rising edge;
displaying a second dark video frame on a second display device in response to the rising edge;
displaying the first video frame on the first display device in response to the falling edge; and
displaying the second video frame on the second display device in response to the falling edge.

18. The method of claim 15, wherein the channel select waveform is a first channel select waveform, the method further comprising:
providing the video data to the first display controller, the second display controller, a third display controller, and a fourth display controller;
displaying the video data on a first display device in response to the first channel select waveform;
displaying first dark video data on a second display device in response to the first channel select waveform;
displaying the video data on a third display device in response to a second channel select waveform; and
displaying second dark video data on a fourth display device in response to the second channel select waveform.

19. The method of claim 15, wherein the channel select waveform is a first channel select waveform, the method further comprising:
providing the video data to the first display controller, the second display controller, a third display controller, and a fourth display controller;
causing the first display controller to display the video data on a first display device in response to the first channel select waveform;
causing the second display controller to display first dark video data on a second display device;
causing the third display controller to display the video data on a third display device in response to a second channel select waveform; and
causing the fourth display controller to display second dark video data on a fourth display device.

* * * * *